(12) United States Patent
Chapin et al.

(10) Patent No.: US 11,628,697 B2
(45) Date of Patent: Apr. 18, 2023

(54) HYDRAULIC GOOSENECK TRAILER COUPLER SYSTEM AND METHOD

(71) Applicants: William K Chapin, Cumby, TX (US); Ronald L Perdue, Kennedale, TX (US)

(72) Inventors: William K Chapin, Cumby, TX (US); Ronald L Perdue, Kennedale, TX (US)

(*) Notice: Subject to any disclaimer, the term of this patent is extended or adjusted under 35 U.S.C. 154(b) by 594 days.

(21) Appl. No.: 15/826,716

(22) Filed: Nov. 30, 2017

(65) Prior Publication Data

US 2018/0126809 A1 May 10, 2018

Related U.S. Application Data

(60) Provisional application No. 62/418,749, filed on Nov. 7, 2016.

(51) Int. Cl.
| | |
|---|---|
| *B60D 1/24* | (2006.01) |
| *B60D 1/06* | (2006.01) |
| *B60D 1/46* | (2006.01) |
| *B60D 1/62* | (2006.01) |
| *B60D 1/36* | (2006.01) |

(52) U.S. Cl.
CPC .......... *B60D 1/246* (2013.01); *B60D 1/065* (2013.01); *B60D 1/36* (2013.01); *B60D 1/46* (2013.01); *B60D 1/62* (2013.01)

(58) Field of Classification Search
CPC .......... B60D 1/246; B60D 1/065; B60D 1/46; B60D 1/62; B60D 1/465
See application file for complete search history.

(56) References Cited

U.S. PATENT DOCUMENTS

| | | | | |
|---|---|---|---|---|
| 2,634,517 A | * | 4/1953 | Zink | E02F 3/6463 37/441 |
| 2,836,443 A | * | 5/1958 | Farmer | F16J 15/164 277/488 |
| 3,722,921 A | * | 3/1973 | Duerksen | B62D 53/00 280/473 |
| 3,891,239 A | * | 6/1975 | Leo | B60D 1/42 280/479.1 |
| 4,669,748 A | * | 6/1987 | LeVee | B62D 53/0828 280/423.1 |
| 4,685,695 A | * | 8/1987 | LeVee | B62D 53/0828 280/441.2 |
| 5,346,233 A | * | 9/1994 | Moser | B62D 53/068 180/24.01 |

(Continued)

*Primary Examiner* — Tony H Winner
*Assistant Examiner* — Michael R Stabley

(57) ABSTRACT

A system and method of raising and lowering a ball coupler for coupling to a ball hitch is provided. A combination of hydraulic pump and hydraulic piston are employed to raise and lower the ball coupler of a gooseneck trailer. Both custom and off the shelf parts combine to create a user friendly system to couple and uncouple a gooseneck trailer to the truck. The system described herein replaces the need to raise and lower a gooseneck trailer's coupling system by hand crank and gear box and even the need to climb into the back of the truck bed. Varying trailer frame configurations and ball coupler sizes can be employed with the present invention. Also described and shown in this provisional is a non-rotating free end hydraulic piston device and method. Also described and shown is a coupling bushing device and method for securing a conventional coupler to piston rod.

14 Claims, 50 Drawing Sheets

(56) References Cited

U.S. PATENT DOCUMENTS

| | | | | |
|---|---|---|---|---|
| 5,409,251 A * | 4/1995 | Thorndyke | B60S 9/12 | |
| | | | 280/475 | |
| 5,868,415 A * | 2/1999 | Van Vleet | B60D 1/065 | |
| | | | 280/483 | |
| 6,234,509 B1 * | 5/2001 | Lara | B60D 1/06 | |
| | | | 280/425.2 | |
| 6,854,757 B2 * | 2/2005 | Rehme | B60D 1/50 | |
| | | | 280/441.2 | |
| 7,097,193 B1 * | 8/2006 | Sievert | B60D 1/065 | |
| | | | 280/438.1 | |
| 7,425,015 B1 * | 9/2008 | Schipman | B60D 1/66 | |
| | | | 280/400 | |
| 8,286,986 B2 * | 10/2012 | Drake | B60D 1/46 | |
| | | | 280/490.1 | |
| 8,376,388 B2 * | 2/2013 | Graber | B60D 1/26 | |
| | | | 280/511 | |
| 8,388,023 B2 * | 3/2013 | Birkholz | B66F 3/08 | |
| | | | 280/763.1 | |
| 8,500,167 B2 * | 8/2013 | Diaz | B60S 9/215 | |
| | | | 280/766.1 | |
| 8,678,471 B2 * | 3/2014 | McCarthy | B60P 3/32 | |
| | | | 296/156 | |
| 8,783,705 B2 * | 7/2014 | Drake | B60D 1/488 | |
| | | | 280/441.2 | |
| 8,783,706 B2 * | 7/2014 | Drake | B62D 53/065 | |
| | | | 280/441.2 | |
| 8,910,965 B2 * | 12/2014 | LaPrade | B60D 1/06 | |
| | | | 280/511 | |
| 9,579,939 B2 * | 2/2017 | Rabska | B60D 1/488 | |
| 9,738,127 B2 * | 8/2017 | Drake | B60D 1/06 | |
| 9,759,018 B2 * | 9/2017 | Stibich | E21B 19/004 | |
| 9,969,313 B2 * | 5/2018 | Engelken | B60P 1/433 | |
| 2003/0047908 A1 * | 3/2003 | Lara | B62D 53/062 | |
| | | | 280/441.2 | |
| 2004/0195801 A1 * | 10/2004 | Lara | B60D 1/46 | |
| | | | 280/490.1 | |
| 2011/0311338 A1 * | 12/2011 | Patrick | A01D 90/083 | |
| | | | 414/24.5 | |

* cited by examiner

Rod fully extended; weight trailer can be shared by coupler/rod and jack stands.

HYDRAULIC GOOSENECK TRAILER COUPLER SYSTEM AND METHOD

CROSS REFERENCE TO RELATED APPLICATIONS

This application claims priority to U.S. Provisional Application No. 62/418,749, filed 7 Nov. 2016, the contents of which are incorporated herein by reference.

FIELD OF THE INVENTION

The present invention relates generally to securing a trailer to a hitch, and more particularly to alleviating manual raising and lowering of gooseneck trailers during hitching and removal.

BACKGROUND OF THE INVENTION

Conventional trailers require manual raising and lowering of the trailer at the time of connecting to respective hitches. FIG. 1A shows a conventional trailer. Turning to FIG. 1A, the front 140 of the trailer 100 rests on two trailer jack stands 110. The goose neck 121 extends from a front 140 of the trailer 100 to a top +Z of coupling frame 161. At the bottom −Z of the coupling frame is a ball coupler 131. The ball coupler 131 attaches to a ball hitch 171. Moving up +Z from the ball coupler 131 is a locking pin 151, which locks the coupler about the ball hitch 171. A coupling pipe 165 is affixed to the ball coupler 131 and extends from the coupling frame 161 and is secured to the coupling frame 161 at least by a rod and pin. To lower the ball coupler 131 onto a truck mounted, not shown, ball hitch 171 a manual crank 101 is turned by hand to raise +Z and lower −Z the trailer 100 by increasing or decreasing a height +Z of the jack stands 110. In conventional practice, after the ball coupler 131 is secured to the ball hitch 171, the stands 110 are lowered further taking the trailer 100 load off the stands 131 and putting the trailer load on the goose neck 121 and coupling system, 161, 165, 131.

It may be desirable to raise and lower a trailer's coupling system without manual cranking of a gear box. In the conventional system, the whole front of the trailer raises and lowers with coupling and uncoupling of the ball coupler to the ball hitch by manually raising and lowering of the jack stands. Low gearing is required to move heavy loads, which in turn increases the time and number of revolutions required to complete the process.

A conventional ball hitch for a gooseneck trailer may be mounted near the center of the truck bed. During conventional coupling of a gooseneck trailer, the user climbs into the bed of the truck at least to maneuver the locking pin when the ball coupler is mounted on the ball hitch. Conventional uncoupling requires a second climb into and out of the truck for ball coupler unlocking and removal.

There may be users capable of driving the trailered load but in need of assistance to couple a conventional trailer to the ball hitch. Assistance may be needed to raise and lower the trailer using the hand crank. Assistance may also be needed at least to lock and unlock the coupler, ascending into and out of the truck bed. If coupling personnel are needed in addition to the driver, field conditions may arise wherein the lone driver is not able to couple or uncouple the load when the need arises. It may be desirable to have a user friendly coupling system and method in field applications. It may be desirable to have a method and system to reduce the manual demands of coupling a trailer to ball hitch for the trailer industry at large.

SUMMARY OF THE INVENTION

The present invention addresses some of the issues presented above by providing a user friendly system and method for coupling and uncoupling a ball coupler of a goose neck trailer to a ball hitch. More particularly, the subject invention raises and lowers a gooseneck ball coupler for securing to and removal from a ball hitch in the absence of manually cranking a gear box. Employment of the present invention alleviates the need to climb into and climb out of the truck bed for locking and unlocking of the ball coupler to the ball hitch in, for example, a gooseneck system. The present invention provides a reliable and user friendly coupling of the trailer to the truck mounted ball hitch. Aspects of the present invention are provided for summary purposes and are not intended to be all inclusive or exclusive. Embodiments of the present invention may have any of the aspects below.

One aspect of the present invention is a ready connection of the invention to a conventional trailer frame-neck.

Another aspect of the present invention is automated mechanical locking of the ball coupler as part of the coupling system and method.

Another aspect of the present invention is raising and lowering of the ball coupler via a hydraulic piston.

Another aspect of the present invention is using an extension stroke and a retraction stroke during the coupling procedure.

Another aspect of the present invention is using an extension stroke and a retraction stroke during the uncoupling procedure.

Another aspect of the present invention is to provide a user with an easy user interface.

Another aspect of the present invention is the compatibility with existing trailer and/or truck power.

Another aspect of the present invention may be the use of an auxiliary battery.

Another aspect of the present invention is a recharging of an auxiliary battery via the truck's alternator.

Another aspect of the present invention is the ready installation of the hydraulic pump and auxiliary battery in an enclosed container.

Another aspect of the present invention is its user friendly operation in industrial applications. In accordance with an exemplary embodiment, two push and hold buttons provide the respective rod extending and rod retracting movements with concurrent ball coupler displacement or load transfer as further described herein.

Yet another aspect of the present invention is a manual override capacity of the invention coupling system, where an existing conventional gear box with hand crank is accommodated; the present invention readily accommodates conventional manual raising and lowering of the trailer.

Yet another aspect of the present invention may be the use of an off the shelf battery.

Another aspect of the present invention may be the use of an off the shelf hydraulic pump.

Another aspect of the present invention may be the use of a bidirectional pump, rated at 3000 psi pump, and running on 12 volts.

Another aspect of the present invention is using stainless steel along the gooseneck frame to flexible rubber 3000 psi hydraulic hoses for the hydraulic lines.

Another aspect of the present invention is accommodation of a driver needing coupling and uncoupling assistance.

Another aspect of the present invention is accommodation of a trailer hauler who cannot or should not raise and lower a trailer by manual means, such as cranking the low geared trailer arm.

Another aspect of the present invention is reduced manual labor required to couple the trailer to the truck.

Another aspect of the present invention is reduced manual labor required to uncouple the trailer to the truck.

Another aspect of the present invention is the incorporation of a conventional ball coupler.

Another aspect of the present invention may be the use of a customized locking method and device in a conventional ball coupler.

Another aspect of the present invention is the use of a custom hydraulic piston with custom cylinder top cap.

Another aspect of the present invention is a custom piston rod assembly.

Another aspect of the present invention is to provide hydraulic powered ball coupler vertical displacement of near eight inches.

Another aspect of the present invention is the application to varying sized/designs of gooseneck trailers and trucks.

Another aspect of the present invention is the use of off the shelf parts in combination with custom parts.

In accordance with yet another embodiment of the present invention, a square cross sectioned coupling frame can readily be anchored to an embodiment of the present invention.

In accordance with yet another embodiment of the present invention, a given invention size readily connects to either a square cross section coupling frame or a circular cross section coupling frame of a same inner width and inner diameter size, respectively. More particularly, the hydraulic cylinder fits inside a square cross section gooseneck pipe.

Another aspect of the present invention is to provide equivalent safety features in invention-piston mode and in manual mode.

Another aspect of the present invention is to maintain conventional load capacity while in invention-piston mode.

Another aspect of the present invention is to provide 12,000 ft·lbs of lift via the hydraulic cylinder.

Another aspect of the present invention is to provide the same minimum and maximum vertical coupling distance capacity as compared to conventional manual coupling, and in turn, accommodate the same conventional trailer/truck combinations as respective conventional gooseneck trailers.

Another aspect is the use of a custom dual directional piston rod head; rod head shown for example in FIG. 3B; the rod head used in combination with three rings, opposite directional seals each on one side of a center ring; rings shown for example in FIG. 11.

Another aspect of the present invention is the use of a custom bushing and affixing method to anchor the ball coupler to the free end of the piston rod.

Another aspect of the present invention is the capacity to provide up to 12,000 pounds of lift (ft·lbs) with 3000 psi of extension pressure.

Another aspect of the present invention is the capacity to lower a load of 12,000 pounds (ft·lbs) with 3000 psi of retraction pressure.

Another aspect of the present invention is a lift and lower design that accommodates a differential in piston head area and piston head area minus piston rod area.

Another aspect of the present invention is the use of a wiping ring at the retaining nut. (FIG. 8)

Another aspect of the present invention is coupling to standard gooseneck ball of 2 and 5/16 inch. In accordance with an exemplary embodiment of the present invention, a BULLDOG coupler (Plymouth, Mich., US) is used, shown for example in FIGS. 21B-21M.

Another aspect of the present invention is the securing of the cylinder top cap to the pipe.

Another aspect of the present invention is the securing of the pipe to the frame as in a conventional system.

Another aspect of the present invention is the use of a rotation-restricted piston head-piston rod assembly.

Another aspect of the present invention is the application of a non-rotation about the vertical axis of a piston rod during piston excursion, extension or retraction.

Another aspect of the present invention is the use of a guide rod to prevent rotation of the piston rod in the horizontal plane.

Another aspect of the present invention is the use of a guide rod to prevent rotation of the piston head in the horizontal plane.

Another aspect of the present invention is a vertically and rotationally anchored cylinder cap to a trailer pipe.

Another aspect of the present invention is anchoring of a cylinder cap to a trailer neck-pipe with a horizontal displacement possible of at or less than 30 thousandths of an inch.

Another aspect of the present invention is preventing extension and retraction induced rotation of the piston head and piston rod via anchoring of the cylinder cap, anchoring a guide rod to the cap, and running the guide rod through the piston head and into the piston rod off center of the piston's axially center.

Another aspect of the present invention is anchoring the near one-half inch guide rod to the cap via threads.

Another aspect is that the custom hydraulic cylinder assembly with a same stroke and piston rod shaft can be adapted for automatic coupling systems for coupling a goose neck trailer to a flatbed truck.

Those skilled in the art will further appreciate the above-noted features and advantages of the invention together with other important aspects thereof upon reading the detailed description that follows in conjunction with the drawings.

DETAILED DESCRIPTION OF THE INVENTION

For more complete understanding of the features and advantages of the present invention, reference is now made to the detailed description of the invention along with the accompanying figures. The present invention uses the conventional coupling frame while providing a hydraulic pump and piston to raise and lower a ball coupler in a gooseneck trailer. Compatibility with conventional trailers and trailer hitches, while maintaining conventional load capacity, provides a trailer coupling system and method with desired industrial application while reducing manual labor required for coupling. The invention, as defined by the claims, may be better understood by reference to the following detailed description. The description is meant to be read with reference to the figures contained herein. This detailed description relates to examples of the claimed subject matter for illustrative purposes, and is in no way meant to limit the scope of the invention. The specific aspects and embodiments discussed herein are illustrative of ways to make and use the invention, and are not intended to limit the scope of the invention. Parallel reference numbers across figures may refer to like elements for ease of reference. Reference numbers may also be unique to a respective figure or embodiment.

A hydraulic pump provides the fluid flow needed to transmit power from a prime mover to a hydraulic actuator, piston. In accordance with the present invention a conventional pump may be employed. The present invention incorporates conventional as well as custom components in accordance with an exemplary embodiments of the present invention.

The invention utilizes a hydraulic system. Force that is applied at one point is transmitted to another point using an incompressible fluid. The fluid may be conventional off the shelf hydraulic oil. The force may be multiplied in the raising and lowering process. In accordance with an exemplary embodiment of the present invention, a single rod with dual direction head forms the piston assembly.

Figure 1A:
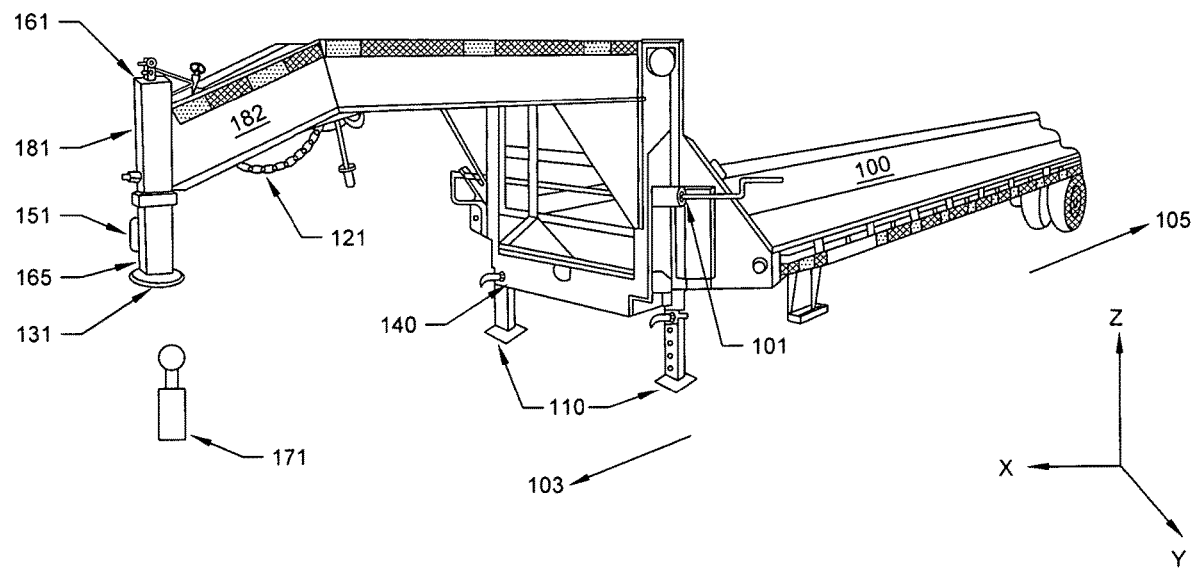
FIG. 1A shows a right front perspective view of a conventional gooseneck trailer and conventional coupling system.
Figure 1B:
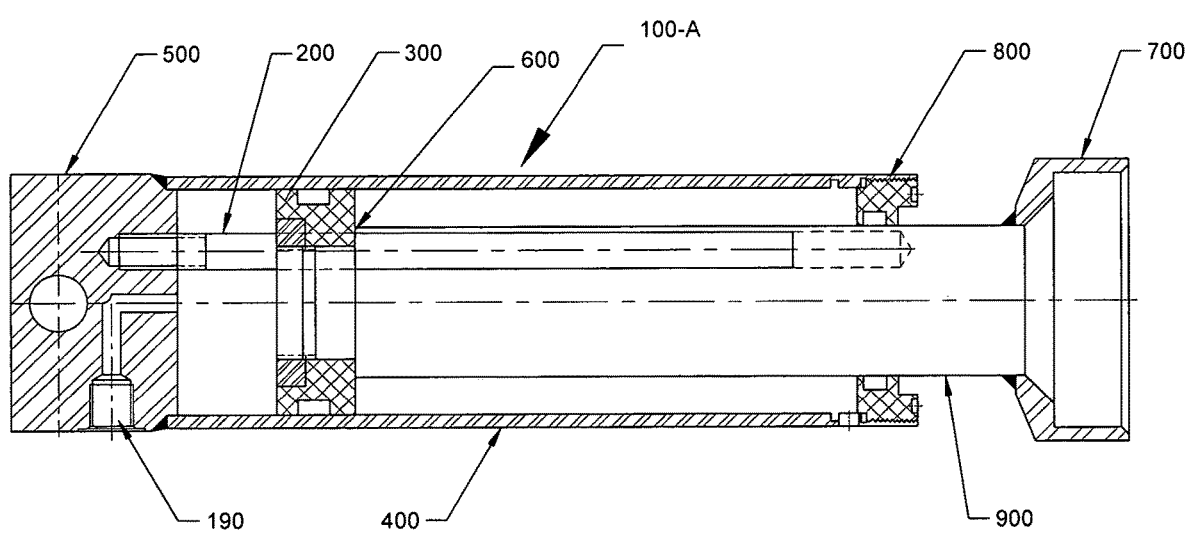
FIG. 1B shows a cross sectional view along axial center of a hydraulic cylinder and piston assembly, in accordance with an exemplary embodiment of the present invention.

FIG. 1B shows a cross sectional view along axial center of a hydraulic cylinder and piston assembly, in accordance with an exemplary embodiment of the present invention. Turning to FIG. 1B, a cylinder top cap 500 closes the top of a hydraulic cylinder 400. Within the cylinder 400 are a piston head 300 and piston rod assembly 600. A cylinder nut 800 allows the piston rod to pass through while retaining fluid within the cylinder 400. A guide rod 200 is affixed to the top cap 500 and extends into the rod 900. A rod to coupler bushing 700 is secured to the exit end of the rod 900. Also shown in the subject view is an upper hydraulic port 190 into the cylinder top cap 500.

Figure 2:
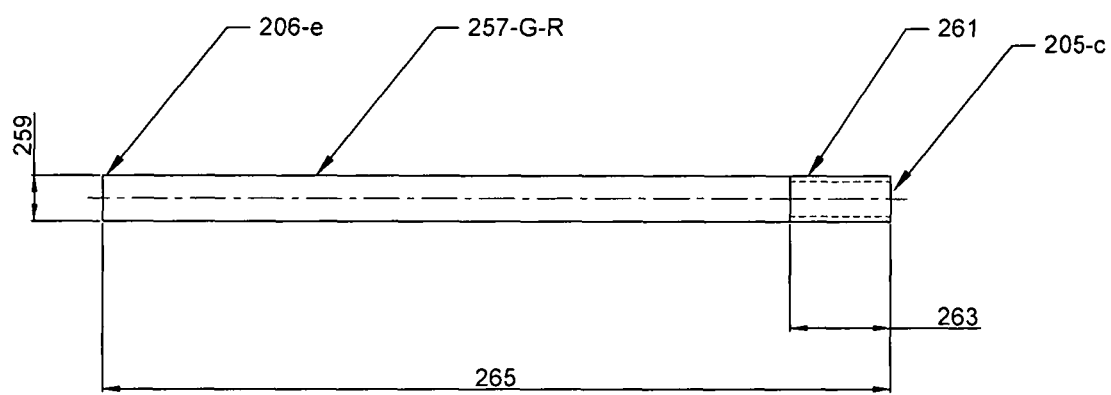
FIG. 2 shows a side view along axial length of a guide rod, in accordance with an exemplary embodiment of the present invention.

FIG. 2 shows a side view along axial length of a guide rod, in accordance with an exemplary embodiment of the present invention. Turning to FIG. 2, a guide rod 200 is shown from its top cap 205-c end to its extension end 206-e. In accordance with an exemplary embodiment, the shaft 257-G-R of the guide rod 200 has a length 265 8.75 inches. In accordance with an alternate embodiment, at its cap end 205-*c*, the guide rod has external threads 261. Further in accordance with an exemplary embodiment, threads are 0.5 inch 13 right hand threads per inch. In accordance with an exemplary embodiment, the rod 200 has a diameter 259 of 0.5 inch. The length 263 of the threaded rod end 261 is 1.125 inches, in accordance with an exemplary embodiment. In accordance with an exemplary embodiment, anchoring of the guide rod 257-G-R on the cap end is by press fit. In accordance with an exemplary embodiment, the guide rod 257_G_R may be 0.5 inches in diameter 259. In accordance with another embodiment, the rod 257-G-R may have external threads and mate with internal threads on the cap 200, shown for example in FIG. 1B.

Figure 3A:
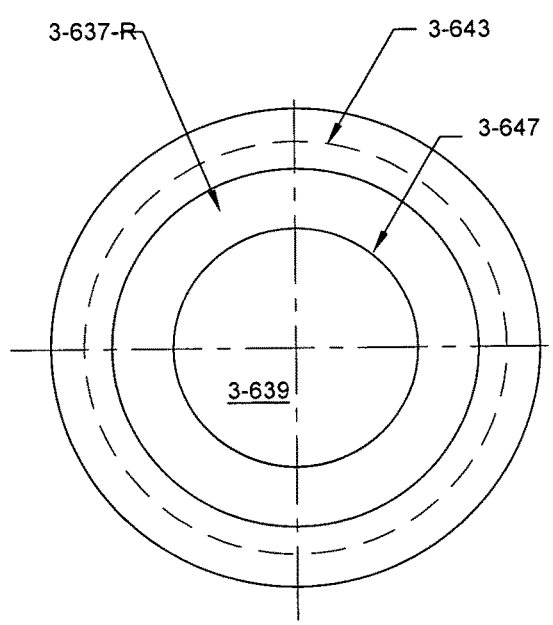
FIGS. 3A and 3B show a bottom view and a cross sectional view along the axis of a piston head, respectively, in accordance with an exemplary embodiment of the present invention.
Figure 3B:
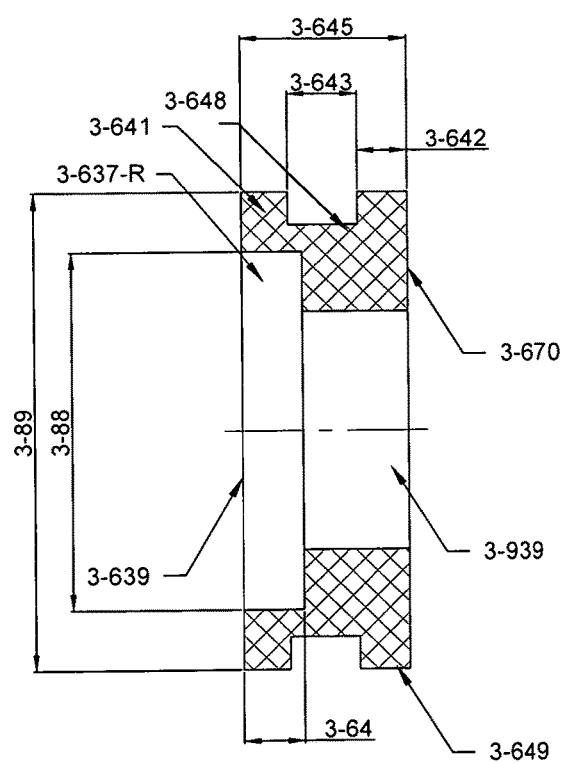

FIGS. 3A and 3B show a top view and a cross sectional view along the axis of a piston head, respectively, in accordance with an exemplary embodiment of the present invention. Turning to first to FIG. 3B, the piston head 3-642 has a ring channel 648 with an exemplary diameter 3-643 near 0.675 inches, in accordance with an exemplary embodiment. The top face 3-639 of the piston head accommodates a threaded spanner nut into the recess 3-637-R for securing the piston rod, not shown, into the head 3-641. Opening 3-367-R had a depth 3-64 near 0.4 inches, in accordance with an exemplary embodiment, to provide a thread depth of near 0.4 inches. The ring channel 648 is centered across a piston head 3-641 height 3-654 and is spaced 3-642 0.375 inches from each edge 3-670, 3-639, in accordance with an exemplary embodiment. The piston head 3-641 has a diameter 3-89, near one inch greater than the nut recess diameter 3-88. Turning to FIG. 3A, opening 3-939, circumscribes an insert rod end, rod not shown. This opening 3-939 steps 3-647 to the recess opening 3-637-R. The recess opening 3-637-R steps to the outer most diameter 3-89, shown in FIG. 3B, of head 3-641.

Figure 4A:
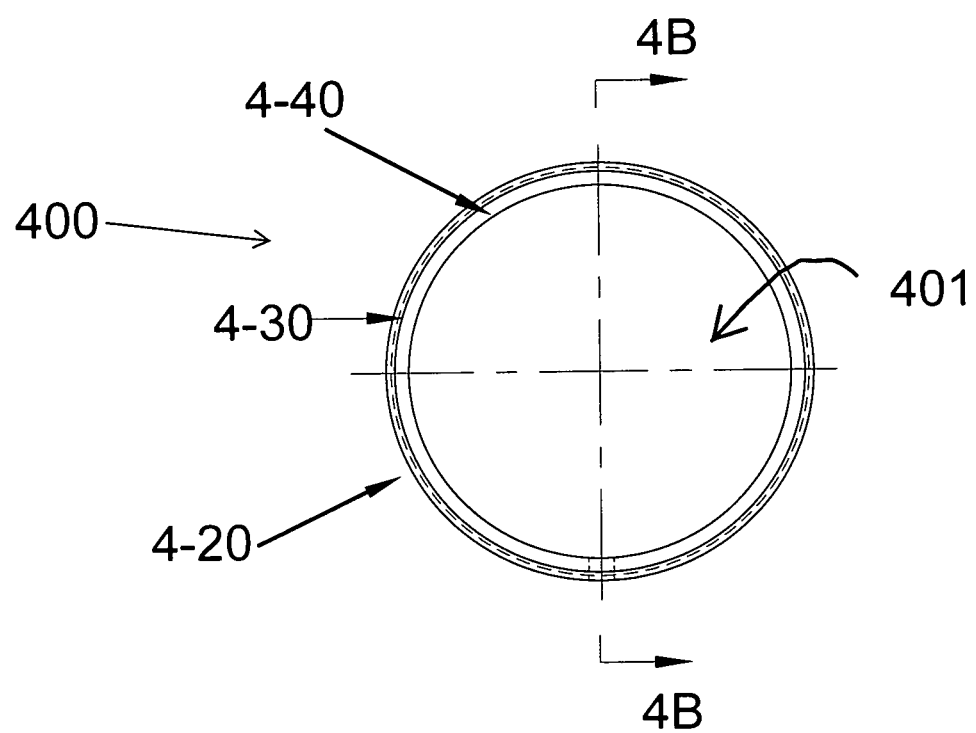
FIG. 4A shows a bottom view a hydraulic cylinder, in accordance with an exemplary embodiment of the present invention.
Figure 4B:
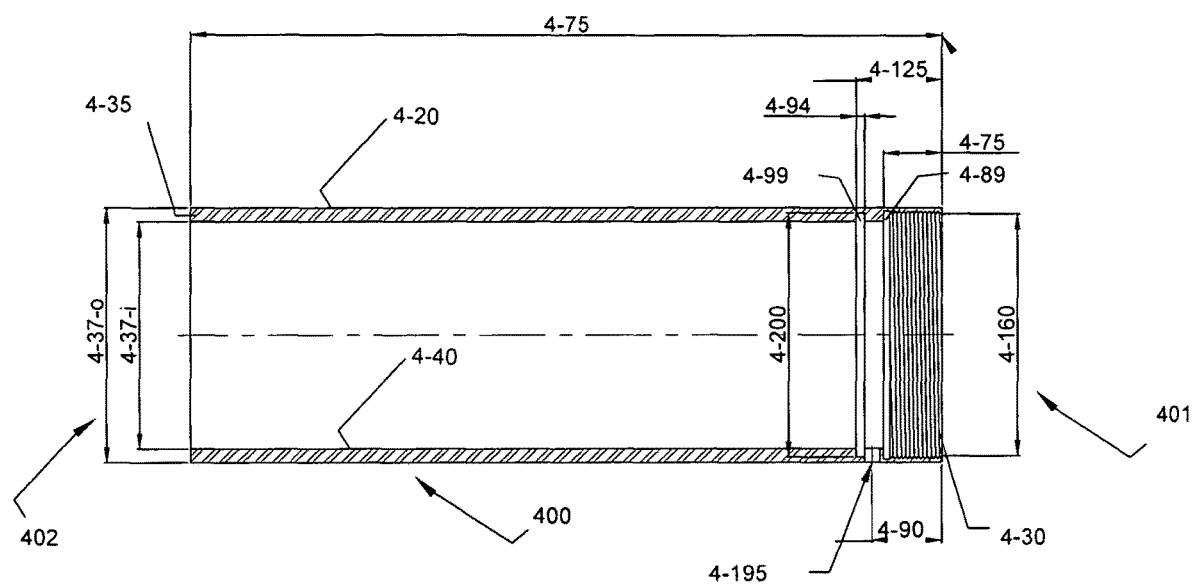
FIG. 4B shows a cross section view taken along axial center, as shown in FIG. 4A of a hydraulic cylinder, in accordance with an exemplary embodiment of the present invention.

FIG. 4A shows a bottom view a hydraulic cylinder, in accordance with an exemplary embodiment of the present invention. Turning to FIG. 4A, at the cylinder nut end 401 of the cylinder 400, internal threads 4-30 are cut into the cylinder's nut end 401 leaving a smooth outer wall 4-20. The threads 4-30 are more particularly shown and described with reference to FIG. 4B. Turning to FIG. 4A, Moving from nut end 401 to cap end 402 a step to the inner wall 4-40 is shown. FIG. 4B shows a cross section view taken along axial center, as shown in FIG. 4A of a hydraulic cylinder, in accordance with an exemplary embodiment of the present invention. Turning to FIG. 4B, the cylinder 400 has an outer diameter 4-37-*o* near 3.375 inches and greater than the inner diameter 4-37-*i*, for a wall thickness 4-35 near 0.375 inches. In accordance with an exemplary embodiment of the present invention, the inner tube wall 4-40 is honed to its 3.00 inch diameter. The cylinder tube 400 has length 4-75, in accordance with an exemplary embodiment, of near 9.75 inches. Internal threads 4-30 on the nut end 401 have depth into the tube toward the cap end 402 4-69 of 0.75 inches, in accordance with an exemplary embodiment. In accordance with an exemplary embodiment, threads 4-30 are 3.125 diameter inches of 12 unified fine thread (UNF) right hand threads. A lower fluid intake port 4-195 sits 0.9 inches into the nut end 401 of the hydraulic cylinder tube 400, in accordance with an exemplary embodiment. To keep the piston head, not shown from blocking the port 4-195, a fluid ring is positioned into groove 4-99 and anchored therein. The ring 4-99 is a distance 4-125 from the nut end 401 and the ring distance 4-125 is greater than the distance 4-90 of the fluid port 4-195. In accordance with an exemplary embodiment, the fluid ring distance 4-125 is 1.125 inches from the nut end 401. Ring groove 4-99 may have an exemplary thickness 4-94 of 0.09 inches and an exemplary diameter 4-200 of 3.2 inches. A cap end 402 of the cylinder is capped, cap not shown, as further described below. In accordance with an exemplary embodiment, the fluid port 4-195 is 0.25 inches, diameter not shown. Moving from nut end 401 to cap end 402, a stop gap 4-89 lacking in threads but of outer thread 4-30 diameter is cut into the inner wall 4-40 of the tube 400. On the cap end 402 of the gap 4-89, the inner wall diameter steps to its final diameter 4-37-*i*.

Figure 4C:
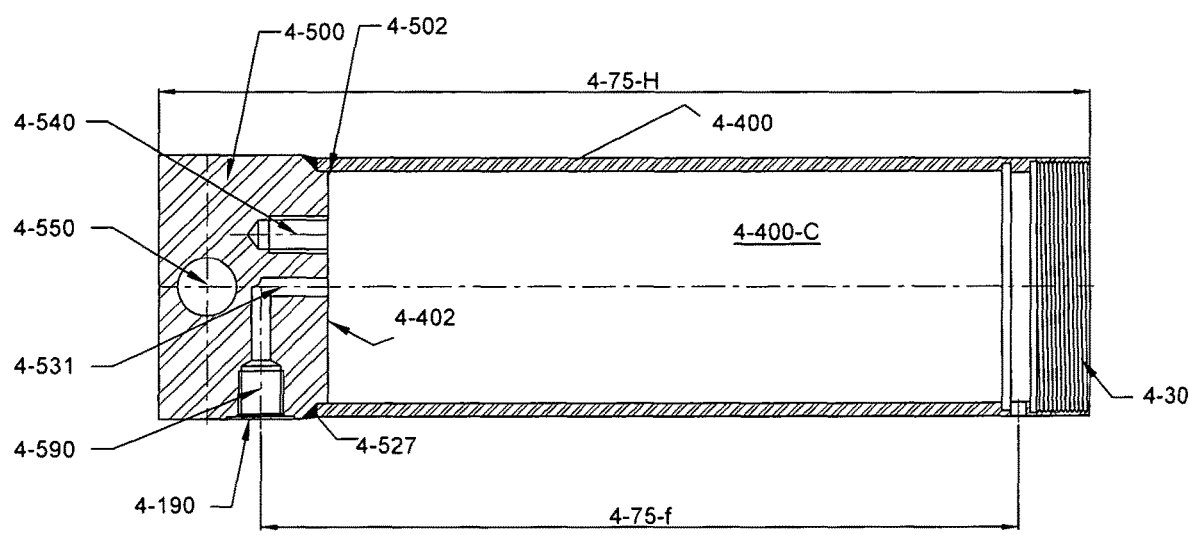
FIG. 4C shows a cross sectional view of a cylinder head attached to a hydraulic cylinder along the axis of a piston head, in accordance with an exemplary embodiment of the present invention.

FIG. 4C shows a cross sectional view of a cylinder top cap attached to a hydraulic cylinder along the axis of a piston assembly, in accordance with an exemplary embodiment of the present invention. The top cap 4-500 is secured to the cylinder tube 4-400 by press fit 4-502 at the cap end 4-402 and a weld 4-527. Further, the cap 4-500 has a through hole 4-550 for mounting the hydraulic cylinder into the goose neck pipe, pipe shown for example in FIG. 5B. An upper fluid port 4-190 is disposed in the cap 4-500 and a port intake 4-590 leads into the fluid pipe 4-531, channeling fluid into the cylinder cavity 4-400-C. The cap 4-500 and cylinder 4-400 as attached have a total length 4-75-H. In accordance with an exemplary embodiment, length 4-75-H is 11.75 inches. FIG. 4C also shows a distance between upper fluid port 4-190 and lower fluid port 4-195, center to center, 4-75-*f*. In accordance to an exemplary embodiment the length 4-75-*f* from center to center is 9.5 inches. Also shown in FIG. 4C is an anchor site 4-540 for the guide rod, rod not shown, where the guide rod is shown, for example, in FIG. 2.

Figure 5A:
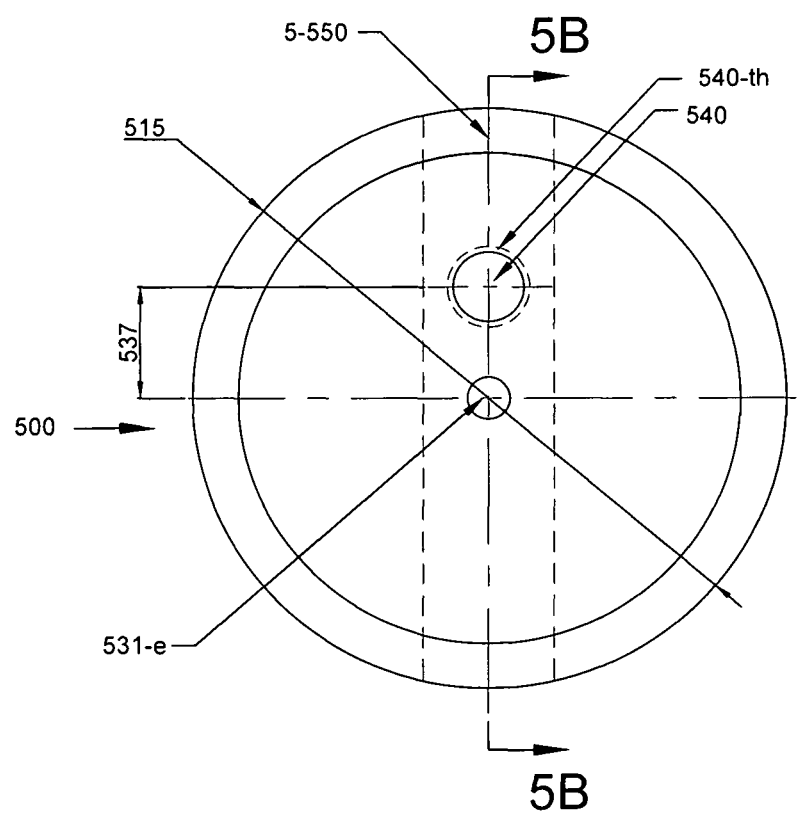
FIG. 5A shows a bottom view a top cap for a hydraulic cylinder, in accordance with an exemplary embodiment of the present invention.

FIG. 5A shows a bottom view a top cap for a hydraulic cylinder, in accordance with an exemplary embodiment of the present invention. At the center of the cap 500 is the exit for the upper fluid port 531-*e*. Displaced from the port 531-1 a center-to-center distance 537 is the anchor site 540 for the guide rod, rod not shown. In accordance with an exemplary embodiment the center to center distance 537 is 0.937 inches. In accordance with an exemplary embodiment the anchor site 540 comprises internal threads 540-*th*. The cap 500 has an outer diameter of 515. In accordance with an exemplary embodiment, the outer diameter 515 is 3.385 inches. Through hole 5-550 for mounting the hydraulic cylinder into the goose neck pipe is shown passing through a center diameter of the cap 500 by dashed line and shown again in the cross sectional view of FIG. 5B, taken along line 5B-5B shown in FIG. 5A.

Figure 5B:
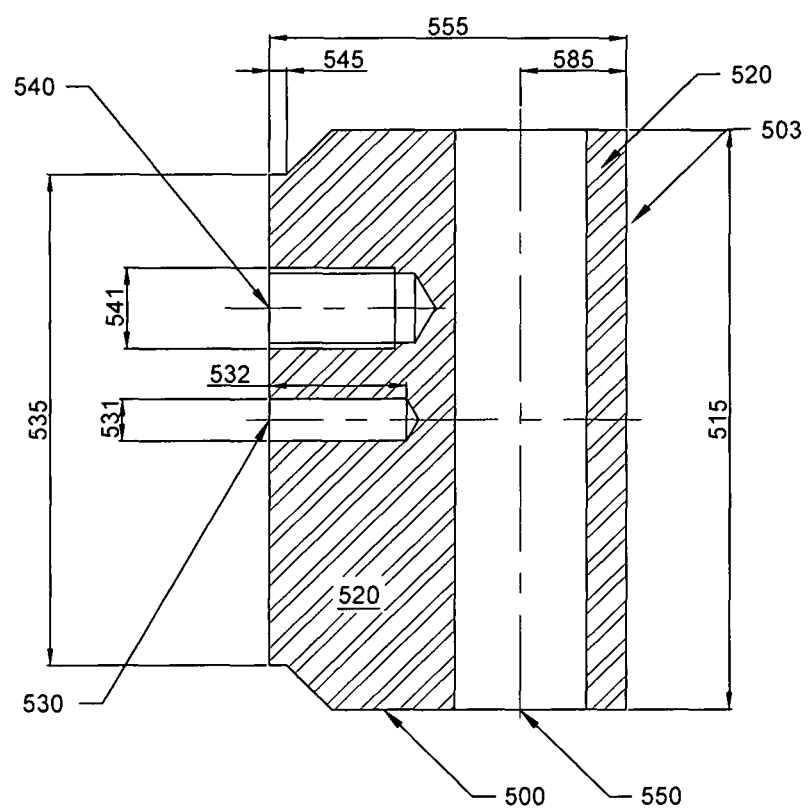
FIG. 5B shows a cross sectional view of a top cap for a hydraulic cylinder taken along the line shown in FIG. 5A, in accordance with an exemplary embodiment of the present invention.

FIG. 5B shows a cross sectional view of a top cap for a hydraulic cylinder taken along the line shown in FIG. 5A, in accordance with an exemplary embodiment of the present invention. The cap 500 has an insert end diameter 535 less than a top diameter 515. In accordance with an exemplary embodiment, insert end diameter 535 is near 3.0 inches, while top diameter is 3.5 inches. The through hole 550 for mounting the hydraulic cylinder assembly in the goose neck pipe is shown and is displaced a distance 585 from the top of the cap 503. The center of the through hole 550 to the outer side of the top 503 of the cap is a distance 585 of 0.625 inches, in accordance with an exemplary embodiment. Cap 500 is a solid piece 520, in accordance with an exemplary embodiment. Also shown in FIG. 5B are the anchor site 540 for the guide rod and the anchor site diameter 541. In accordance with an exemplary embodiment the anchor site diameter 541 is 0.499 inches for press fit. Upper fluid channel 531 is shown with its diameter 531 and depth 532 into the cylinder cap 500. In accordance with an exemplary embodiment, the fluid channel diameter 531 is 0.25 inches while the depth of the channel in the cross sectional view shown is 0.9 inches. Also shown is the total cap height 555 and the insertion distance 545. In accordance with an exemplary embodiment, the cylinder cap has a height 555 of 2.5 inches and an insertion height 545. of 0.125 inches.

Figure 6A:
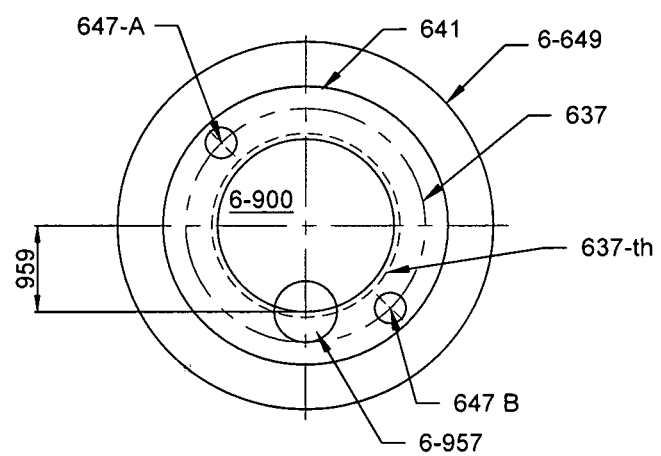
FIG. 6A shows a bottom view of a piston head assembly, in accordance with an exemplary embodiment of the present invention.

FIG. 6A shows a top view of a piston head assembly, in accordance with an exemplary embodiment of the present invention. Turning to FIG. 6A, a pair of spanner wrench holes 647-A and 647-B are shown disposed in a spanner nut 637. Also shown is the through hole 6-957 for the guide rod, guide rod shown for example in FIG. 2; the guide rod channel 957 is shown for example in FIG. 6B. Also shown are spanner nut 636 threads 637-th. Also shown is a distance 6-959 from a center of the piston rod 900 to a center of the guide rod through hole 6-957. The outer most edge 649 of the piston head 641 is also shown in this view.

Figure 6B:
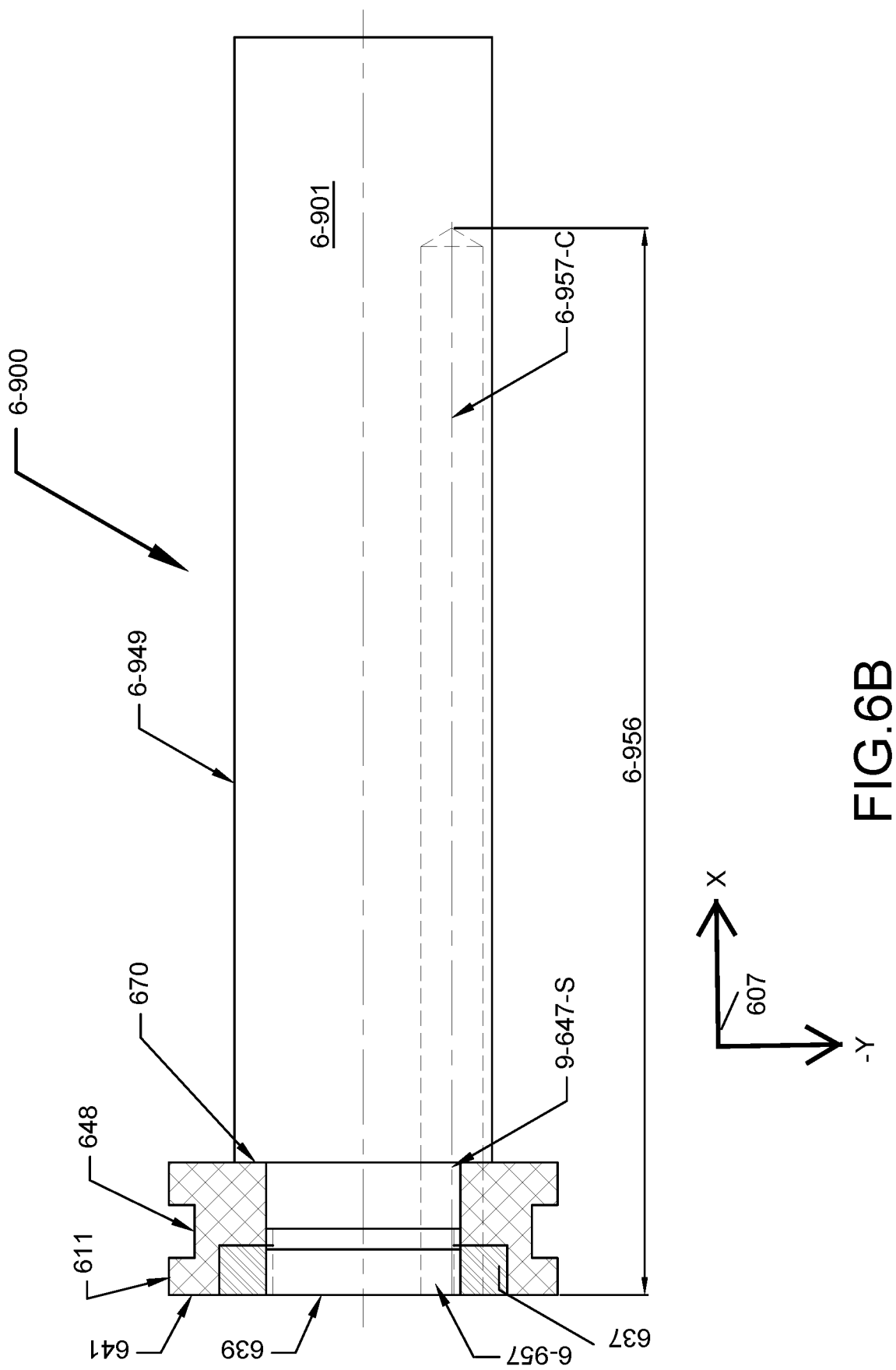
FIG. 6B shows a cross sectional view of a piston rod assembly, head and rod, taken along axial center, in accordance with an exemplary embodiment of the present invention.
Figure 7A:
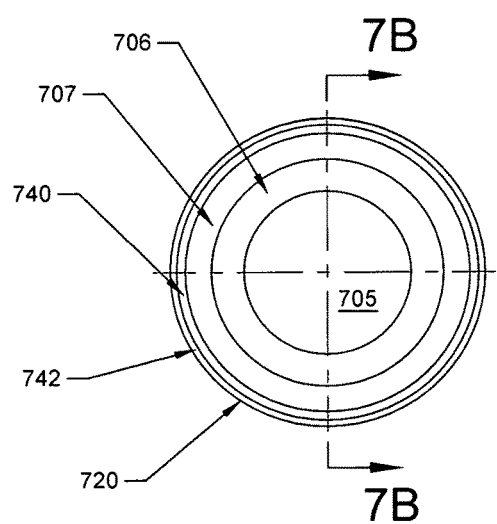
FIGS. 7A and 7B show a bottom view and a cross sectional view, respectively, of bushing for coupling a coupler to a piston rod, in accordance with an exemplary embodiment of the present invention.
Figure 7B:
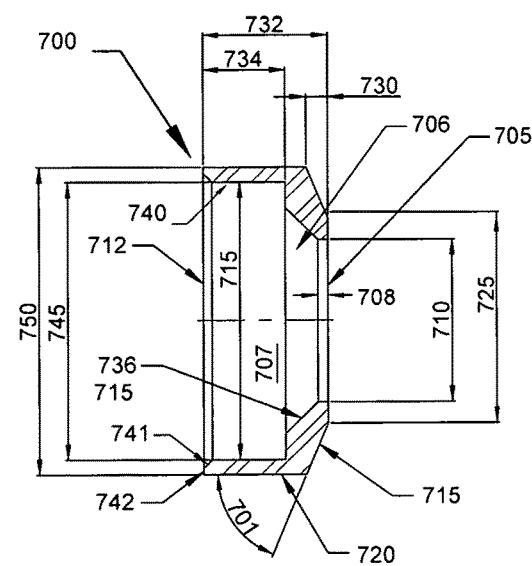
Figure 20A:
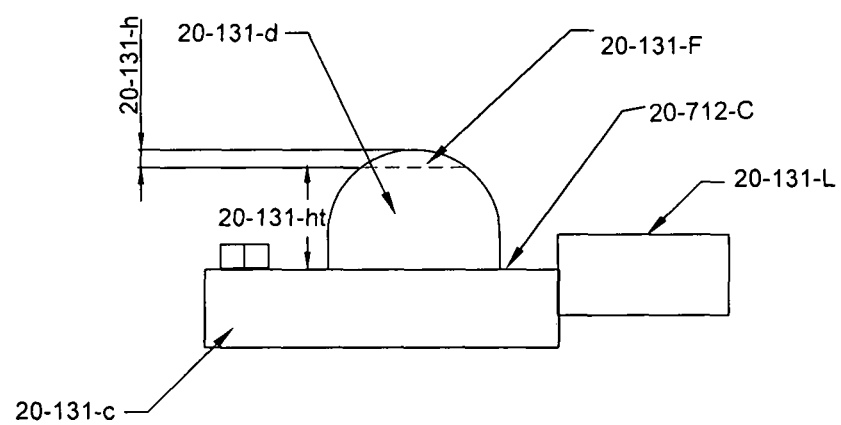
FIG. 20A shows a side view of a coupler, in accordance with an exemplary embodiment of the present invention.

FIG. 6B shows a cross sectional view of a piston rod assembly, head and rod, taken along axial center, in accordance with an exemplary embodiment of the present invention. Piston rod assembly 6-900 shows head 641 secured to rod 6-901. Turning to the head 641, the ring channel 648 is shown and the spanner nut 637 is shown seated in the recess 3-637-R, recess shown in FIG. 3B. Turning again to FIG. 6B, The spanner nut 637 is secured both around the head end 639 of the piston rod and within the piston head 640 by inner threads and outer threads, respectively, threads not shown. The step in rod diameter 9-647-S is also shown in this head rod assembly 6-900. Also shown is the head 641 rod 901 interface 670 between step 9-647-S and the rod's outer edge 949. A top opening 6-957, shown in dashed lines, crosses spanner nut 637 and the head side of the rod 639. The opening 6-957 extends through the head 641 and into the rod 901 in the X direction 607 and forms a guide rod channel 6-957-C cavity. The length 6-956 of the guide rod channel cavity 6-957-C is also shown, and in accordance with an exemplary embodiment is near 8.5 inches FIGS. 7A and 7B show a bottom view and a cross sectional view of bushing for coupling a coupler to a piston rod, in accordance with an exemplary embodiment of the present invention. Turning to FIG. 7A, an inner most opening 705 accommodates a rod end 901, shown for example in FIG. 6B. Returning to FIG. 7A, a diameter transition 706 is shown from the inner most rod accommodating opening 705 to the coupler accommodating bushing side 707. A chamfer, shown in FIG. 7B 741, is used from an inner wall 740 of the coupler side 712 to an interim wall thickness 742 on the coupler side and is shown more particularly in FIG. 7B. And finally, the outer wall 720 of the coupler side 712 is shown. Turning to FIG. 7B. The bushing has an outermost rod side diameter 725 and a bushing coupler side 712 outer most diameter 750, where the latter is greater than the former. In accordance with an exemplary embodiment rod side 705 outer diameter 725 is 2.5 inches and coupler side outer diameter 750 is 3.75 inches. At the rod side 705, an inner diameter 710 is constant for height 708 and readily accommodates a press fit of the rod's bushing end. From the rod accommodating constant diameter 710, the bushing expands with at or near linear slope 736. At the coupler side 712 of the slope 736 the inner diameter steps to a diameter 715 of the coupler opening 707. At the coupler end 712 a chamfer 741 of the bushing wall assists in seating the bushing 700 upon the modified coupler. Turning to FIG. 7A, the outermost bushing wall 720 is shown at its coupler end 712. Moving inward, a start of the chamfer from mid outer wall 742 to inner side of bushing's coupler wall 740, yields diameter 745, shown in FIG. 7B. The coupler side 712 of bushing 700 has a height 734 at its inner diameter of 715. In accordance with an exemplary embodiment, height 734 is 1.0 inches. The height 732 of the bushing 700 from coupler side 712 to rod side 705 is shown. In accordance with an exemplary embodiment, the height 732 is 1.50 inches. In assembly, a 0.25 inch weld is used across the 712-20-712-C interface, where coupler surface 20-712-C is shown in FIG. 20A. Referring again, to FIG. 7B, the chamfer 741 may be 0.125 inches at 45 degrees in accordance with an exemplary embodiment. In accordance with an exemplary embodiment, slope 736 may be 0.25 inches at 45 degrees as shown. And angle 701 may be 60 degrees, in accordance with an exemplary embodiment. In accordance with an exemplary embodiment inner bushing diameter 710 on the rod side 705 may be 2.004 inches plus or minus 0.001 inches. The outer diameter 750 of the coupler side 712 slopes to the outer diameter 725 of the rod side over height 730, where height 730 may be 0.25 inches, in accordance with an exemplary embodiment. The height 708 of the constant diameter 710 rod side 705 may be 0.25 inches in accordance with an exemplary embodiment.

Figure 8A:
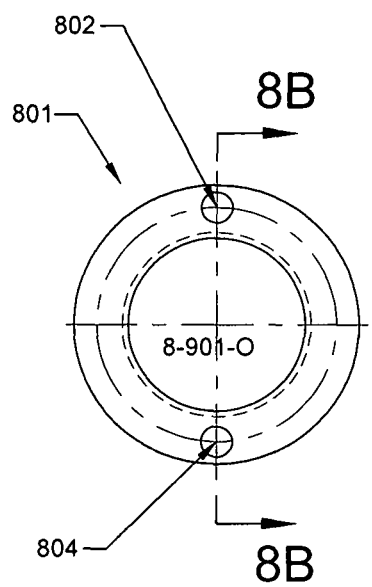
FIGS. 8A and 8B show a bottom view and a cross sectional view, respectively, of retaining nut for a hydraulic cylinder, in accordance with an exemplary embodiment of the present invention.
Figure 8B:
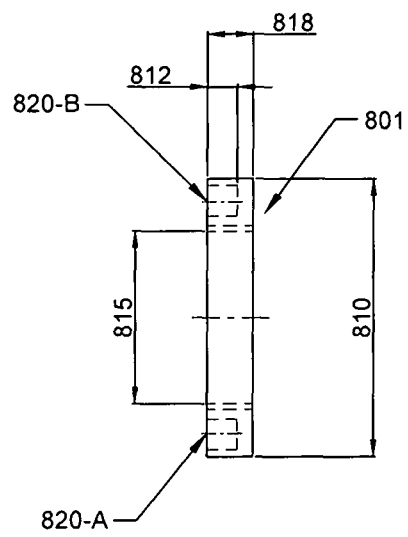

FIGS. 8A and 8B show a bottom view and a cross sectional view of retaining nut for a hydraulic cylinder, in accordance with an exemplary embodiment of the present invention. Turning to FIG. 8A, a rod opening 8-901-0 is shown at the center of the retaining nut for hydraulic cylinder 801. Two spanner wrench openings 802, 804 are shown 180 degrees apart. Line 8B-8B, shows the cross sectional view taken of the nut from FIG. 8A. Turning to FIG. 8B, the nut has an outer diameter 810. The outer threads on the nut 801, not shown, mate with threads 4-30, shown for example in FIG. 4B. the nut has a thickness 818, and holes 820-A and 820-B have a depth 812. In accordance with an exemplary embodiment, the thickness of the nut 815 is 0.375 inches, while the spanner hole depth 820-A, 820-B are both 0.25 inches.

Figures 9A, 9B:
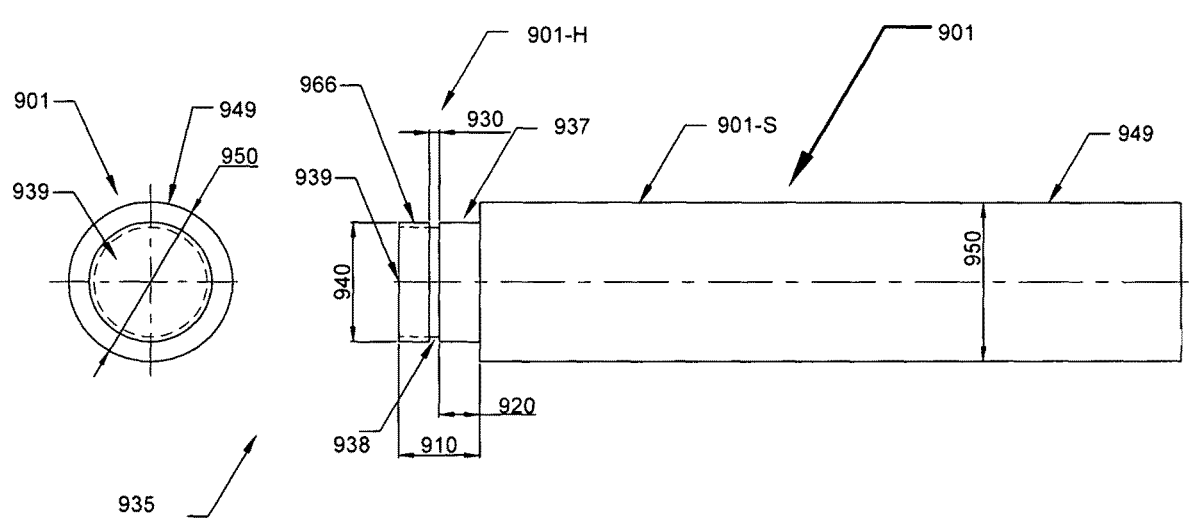
FIGS. 9A and 9B show a top view and a side view along the axis of a piston rod, respectively, in accordance with an exemplary embodiment of the present invention.

FIGS. 9A and 9B show a top view and a side view along the axis of a piston rod, respectively, in accordance with an exemplary embodiment of the present invention. Turning first to FIG. 9A, the top view is taken from the piston head side 939 of the rod 901. The outermost rod diameter 950 of the rod extends across outer surfer 949. Turning to FIG. 9B, the rod 901 has a shaft portion 901-S and a head portion 901-H. The rod shaft's 901-S outer diameter 950 is shown in both FIGS. 9A and 9B. The outer surface 949 of the shaft of the rod 901 which extends and retracts is shown. Turning to FIG. 9B, the portion 901-H of the rod 901 is circumscribed by the head 641 when assembled, head not shown, and has a height 910. External threads, not shown, are present along surface 966 which mate with the spanner nut in recess 3-637-R. Moving from head 901-H to shaft 901-S, a nut gap 938 has a non-threaded decreased diameter 938 and is provided to limit the excursion of the nut and to assist in providing a stable mechanical connection. The step down in diameter nut gap 930 has a height 930, which in accordance with an exemplary embodiment may be 0.125 inches. Continuing along the rod 901 from head 901-H end to shaft 901-S a second diameter step 937, returning to 940 is made, with a height 920 spanning the 901-H head from shaft 901-S to nut gap 938. In accordance with an exemplary embodiment, the head portion 901-H diameter 940 is 1.5 inches, in accordance with an exemplary embodiment. And in accordance with an exemplary embodiment, the rod shaft 901-S diameter 950 may be 2.0 inches.

Figure 10:
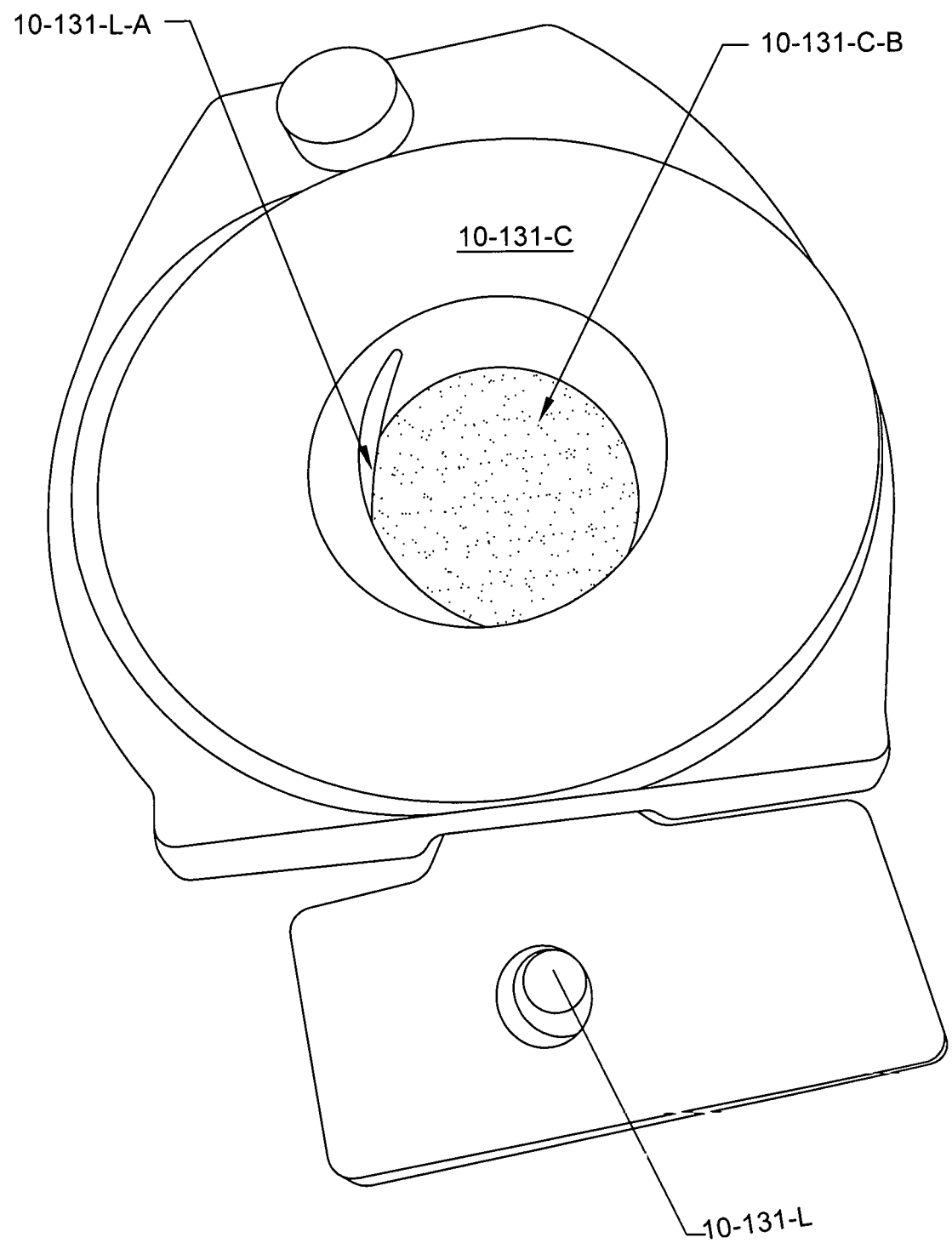
FIG. 10 shows a bottom perspective view of a coupler in its locked position, in accordance with an exemplary embodiment of the present invention.

FIG. 10 shows a bottom view of a coupler in its locked position, in accordance with an exemplary embodiment of the present invention. Turning to FIG. 10, a conventional coupler is modified to form a coupler 10-131-C, in accordance with an exemplary embodiment, for connection to the rod 901, rod shown, for example in FIG. 9B. Turning again to FIG. 10, the locking pin, pin not shown, extends into locking pin hole 10-131-L when the coupler 10-131-C is locked. The coupler 10-131-C is shown in the locked position with locking arm 10-131-L-A visible in the ball accommodating cavity 10-131-C-B. The locking mechanism securing the the coupler 10-131-C to the ball hitch, ball not shown, via the locking arm 10-131-L-A is operates in conventional fashion, in accordance with an exemplary embodiment.

Figure 11:
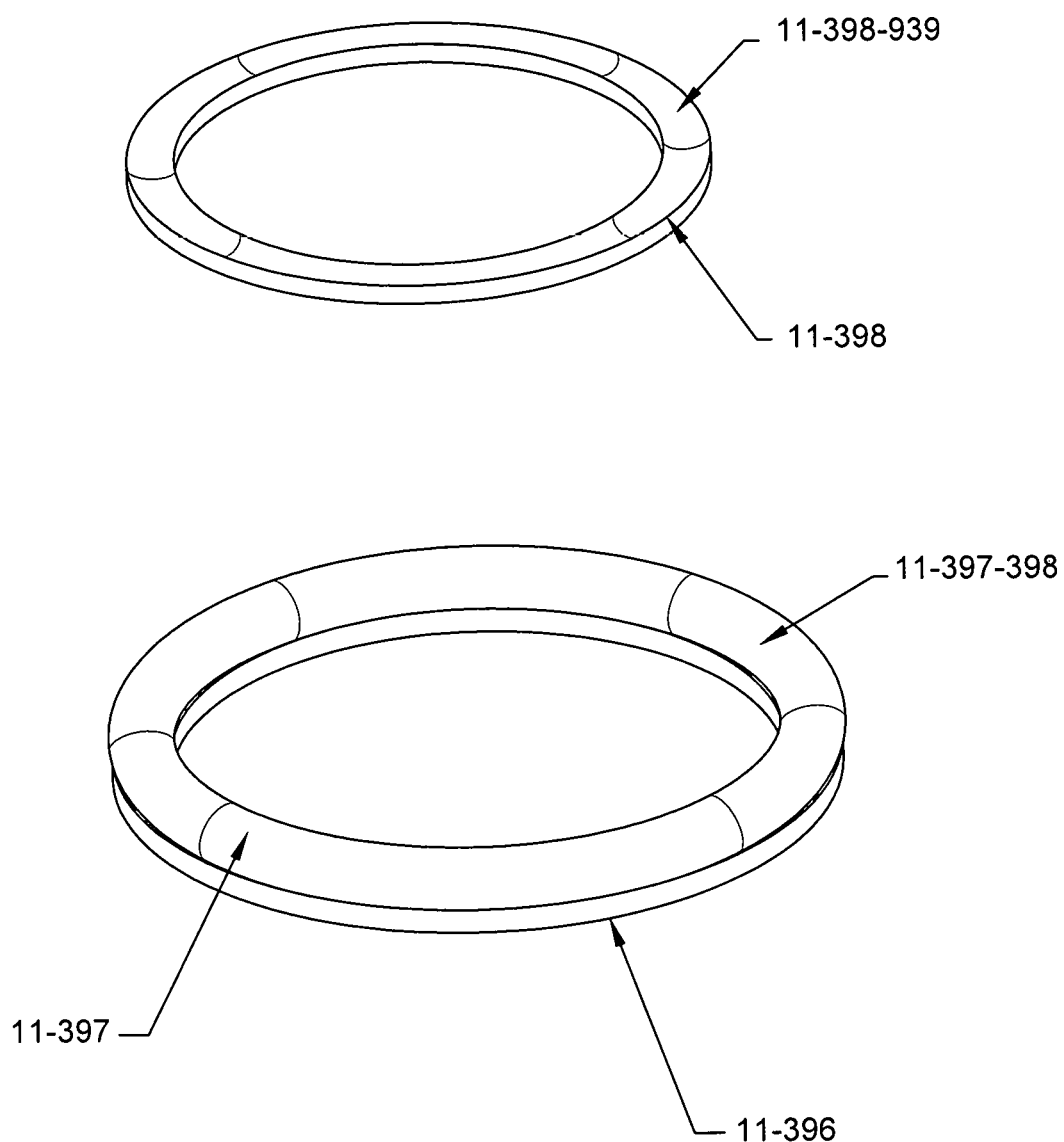
FIG. 11 shows a top perspective view of three rings, an extension directional ring, a retraction directional ring, and the center ring, in accordance with an exemplary embodiment of the present invention.

FIG. 11 shows a digital image of three rings, an extension directional ring, a retraction directional ring, and the center ring, in accordance with an exemplary embodiment of the present invention. Turning to FIG. 11, a round center ring 11-397 sits atop extension directional ring 11-396. Retraction direction ring 11-398 is shown above round center ring 11-397. When assembled, ring 11-398 will be seated above round ring 11-397 at the 11-397-398 interface. The assembled three rings 11-396, 11-387, 11-398 will seat into ring channel 648 of the piston head 3-642, shown for example in FIGS. 6B and 3B.

Figure 12:
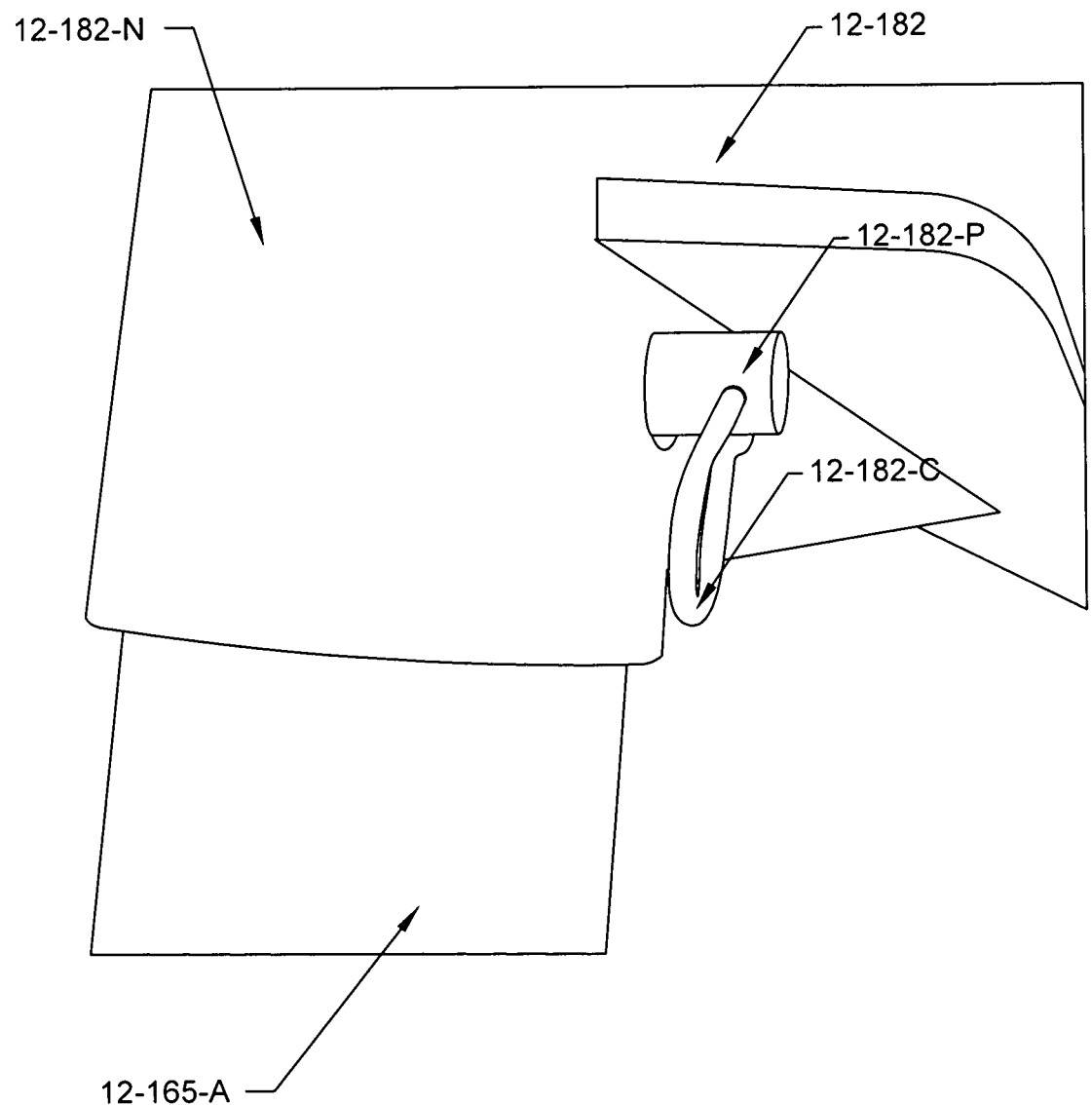
FIG. 12 shows a conventional gooseneck coupled to a pipe, in accordance with an exemplary embodiment of the present invention as applied to a conventional gooseneck trailer.

FIG. 12 shows an image of a conventional gooseneck coupled to a pipe, in accordance with an exemplary embodiment of the present invention as applied to a conventional gooseneck trailer. Turning to FIG. 12, a gooseneck trailer 12-182 is shown with the neck of the gooseneck 12-182-N. The trailer 12-182 and neck 12-182-N may be conventional, in accordance with an exemplary embodiment of the present invention. Pipe 12-165-A is accommodated by a conventional trailer 12-182 and the pipe 12-165-A, in accordance with an exemplary embodiment, is of conventional diameter, height, and material. The pipe 12-165-A is shown secured to the neck at 12-182-N via post 12-182-P and cotter pin 12-182-P. Also shown in a cotter pin 12-182-C through the post 12-182-P end.

Figure 13:
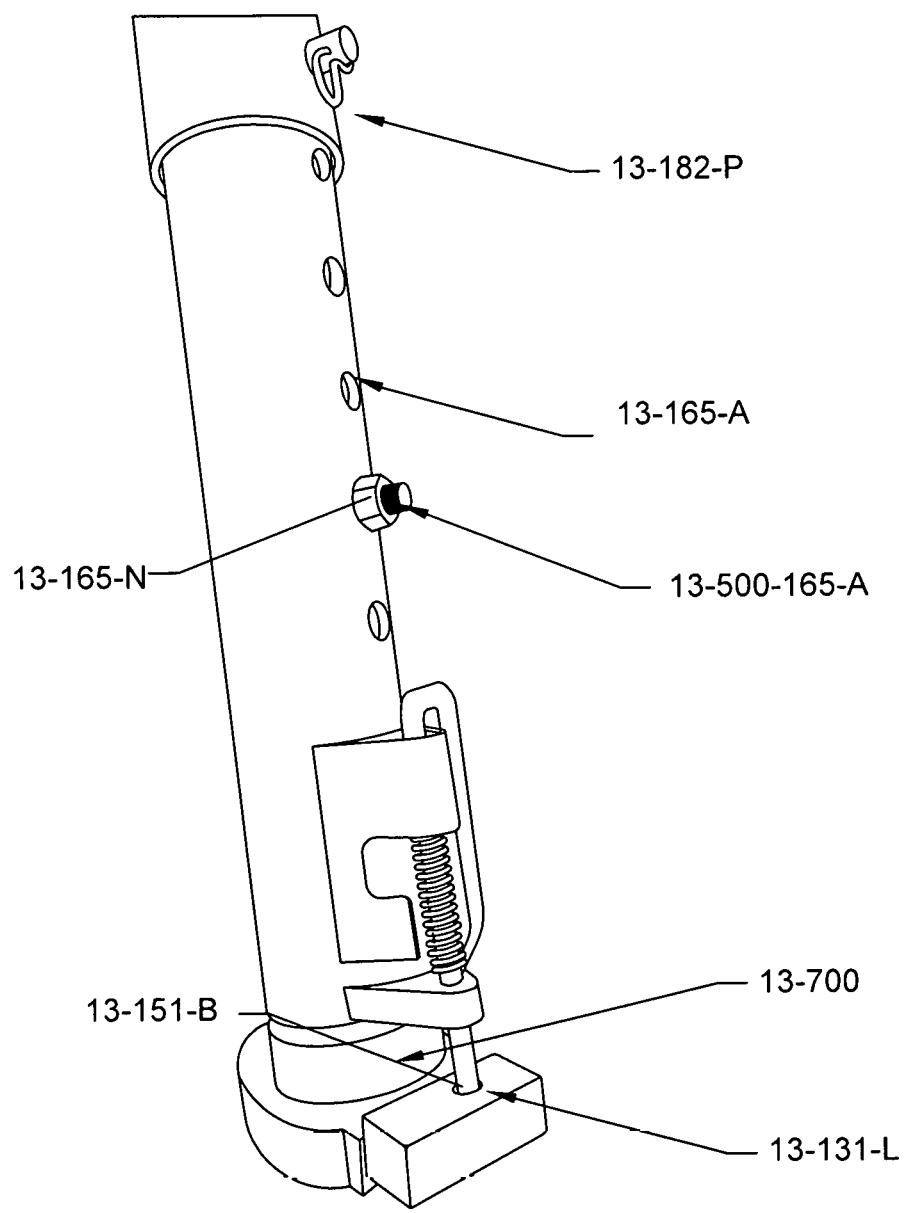
FIG. 13 shows exterior connections of an exemplary embodiment of the present invention from a side view perspective.

FIG. 13 shows exterior connections of an exemplary embodiment of the present invention secured to a gooseneck pipe, in accordance with an exemplary embodiment of the present invention from a side view perspective. Turning to FIG. 13, bolt 13-500-165-A extends through cap 500 via through hole 550, shown for example in FIG. 5A, and out pipe 13-165-A. A locking nut 13-165-N, with washer, washer not shown, secures the bolt 13-500-165-A, anchoring the hydraulic piston assembly, shown for example in FIG. 2, into the pipe 13-165. In accordance with an exemplary embodiment, an alternate fastener may be used to secure the bolt 13-500-165 in place. Also shown are the bushing 13-700 which secures the piston rod 901 to the coupler 13-131-C. A bottom of locking pin 13-151-B is shown inserted into locking pin hole 13-131-L.

Figure 14:
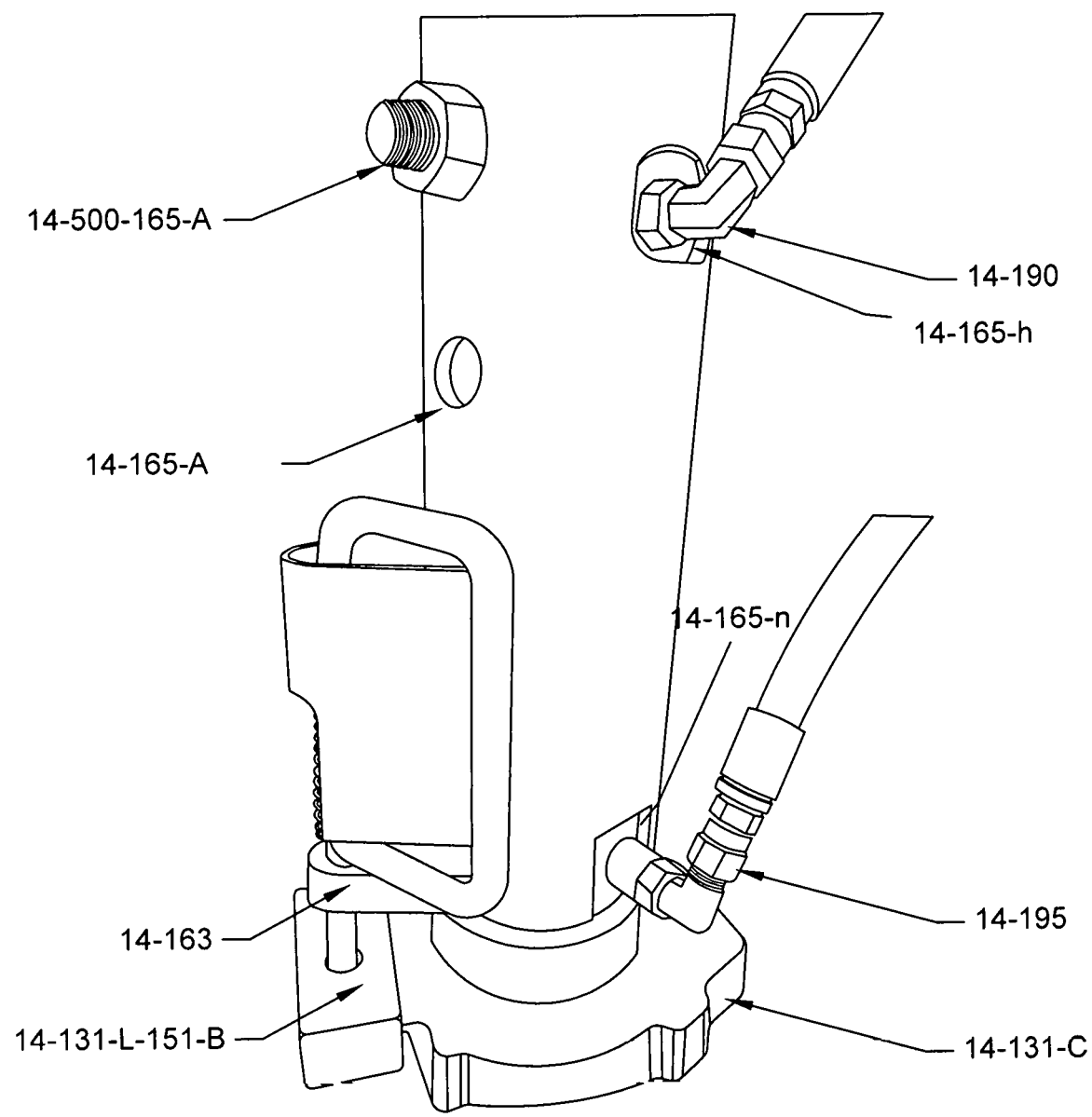
FIG. 14 shows exterior hydraulic connections into the cylinder and passing through the pipe, in accordance with an exemplary embodiment of the present invention from a side view perspective.

FIG. 14 shows the exterior hydraulic connections of an assembled hydraulic assembly mounted in the pipe, in accordance with an exemplary embodiment of the present invention, from a side view perspective. The hydraulic coupler is secured to the pipe via bolt 14-500-165-A. An upper hydraulic port 14-190 is shown above a lower hydraulic port 14-195. In accordance with an embodiment of the present invention, a hole 14-165-h to accommodate hydraulic port 14-190 maybe cut into a conventional pipe. And a notch 14-165-n is made in a conventional pipe, to accommodate the lower hydraulic port 14-165. The coupler 14-131-C is also shown. While the locking pin is shown inserted into the coupler lock 14-131-151-B in locked position. And the locking pin bracket 14-163 is shown securing the locking pin's orientation and position relative to the pipe 14-165-A.

Figure 15:
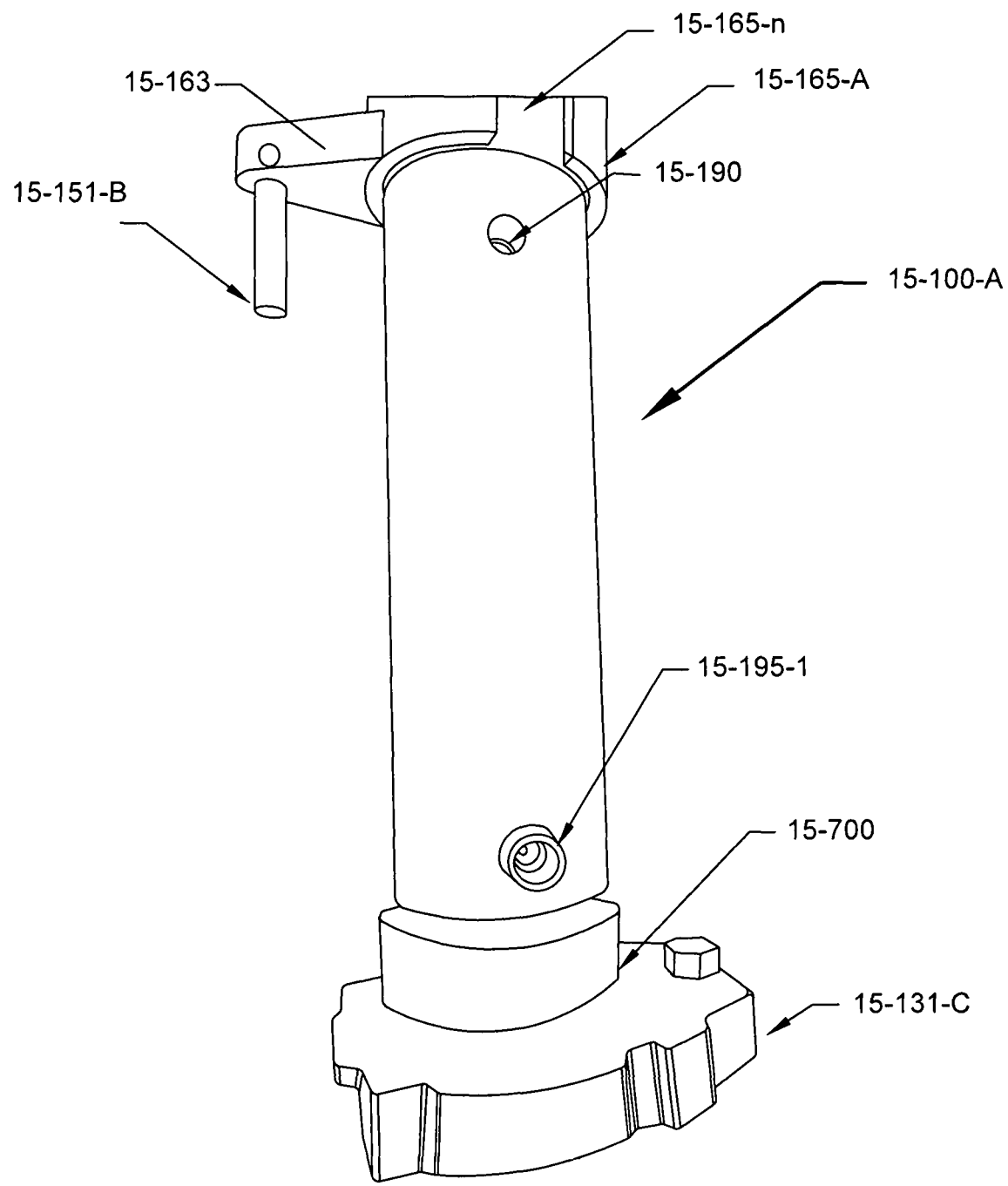
FIG. 15 shows a bushing and its coupling to the coupler and its coupled position relative to the cylinder when also coupled to the piston rod, in accordance with an exemplary embodiment of the present invention.

FIG. 15 shows a bushing and its coupling to the coupler and its coupled position relative to the cylinder when also coupled to the piston rod, in accordance with an exemplary embodiment of the present invention from a side view perspective. Turning to FIG. 15, A hydraulic piston, piston not shown, is shown coupled a coupler 15-131-C via bushing 15-700. The rod, shown for example in FIG. 7B, is assembled into cylinder assembly 15-100-A and is not visible in the present view. The cylinder assembly, shown for example in FIG. 1B, is shown during insertion into pipe 15-165. Lower hydraulic port connection 15-195-1 is also shown. Upper hydraulic port 15-190 into the cylinder 15-100-A is also shown, in accordance with an exemplary embodiment of the present invention. The bottom of the locking pin 15-151-B is also shown secured to pipe 15-165-A and held in a vertical position, via bracket 15-163.

Figure 16:
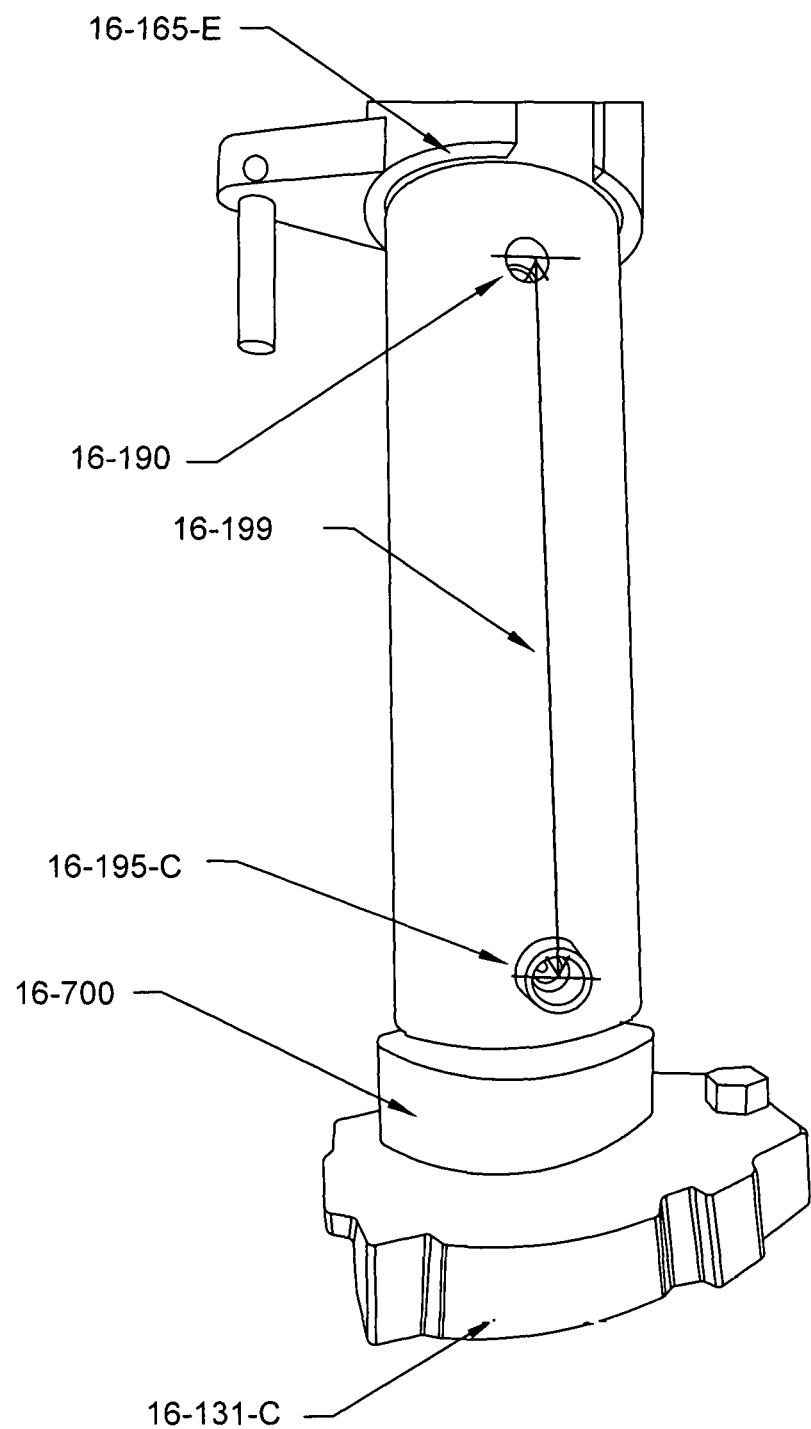
FIG. 16 shows two fluid ports into the cylinder, in accordance with an exemplary embodiment of the present invention from a side view perspective.

FIG. 16 shows two fluid ports into the cylinder, in accordance with an exemplary embodiment of the present invention from a side view perspective. Turning to FIG. 16, the upper port 16-190 and lower hydraulic port with connection are shown 16-195-C. The center to center distance 16-199 of the same is shown. In accordance with an exemplary embodiment the center to center distance is 8.5 inches. The lower edge of the pipe 15-165-E is shown as well as the bushing 16-700 to coupler 16-131-C.

Figure 17A:
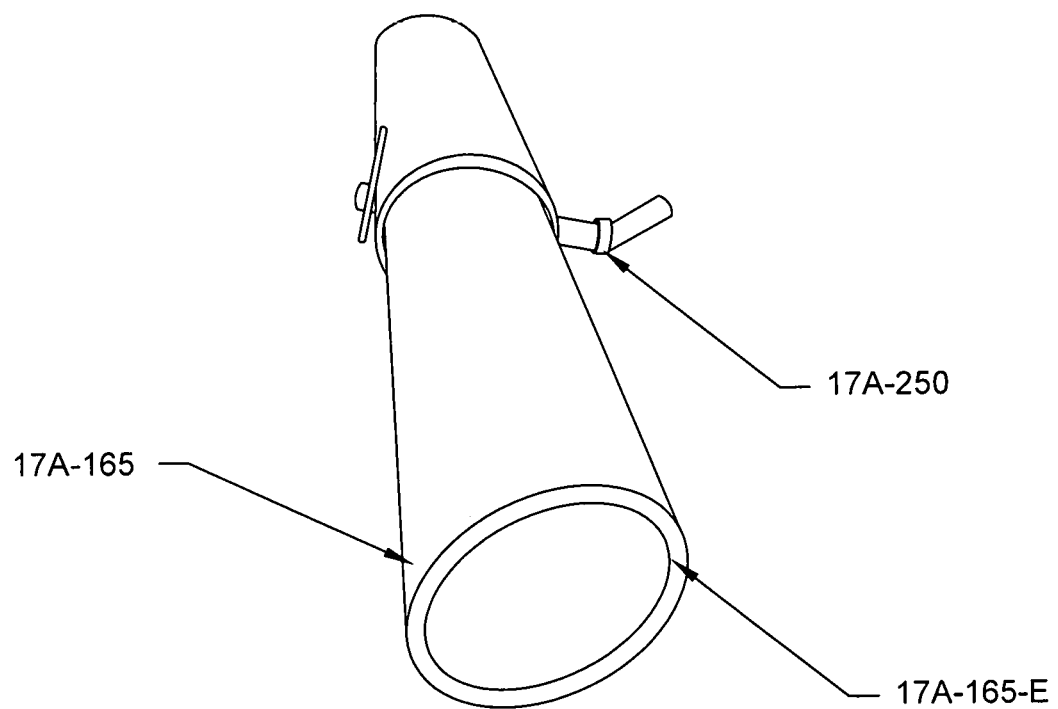
FIGS. 17A and 17B show conventional pipe and a pipe, in accordance with an exemplary embodiment of the present invention, respectively.
Figure 17B:
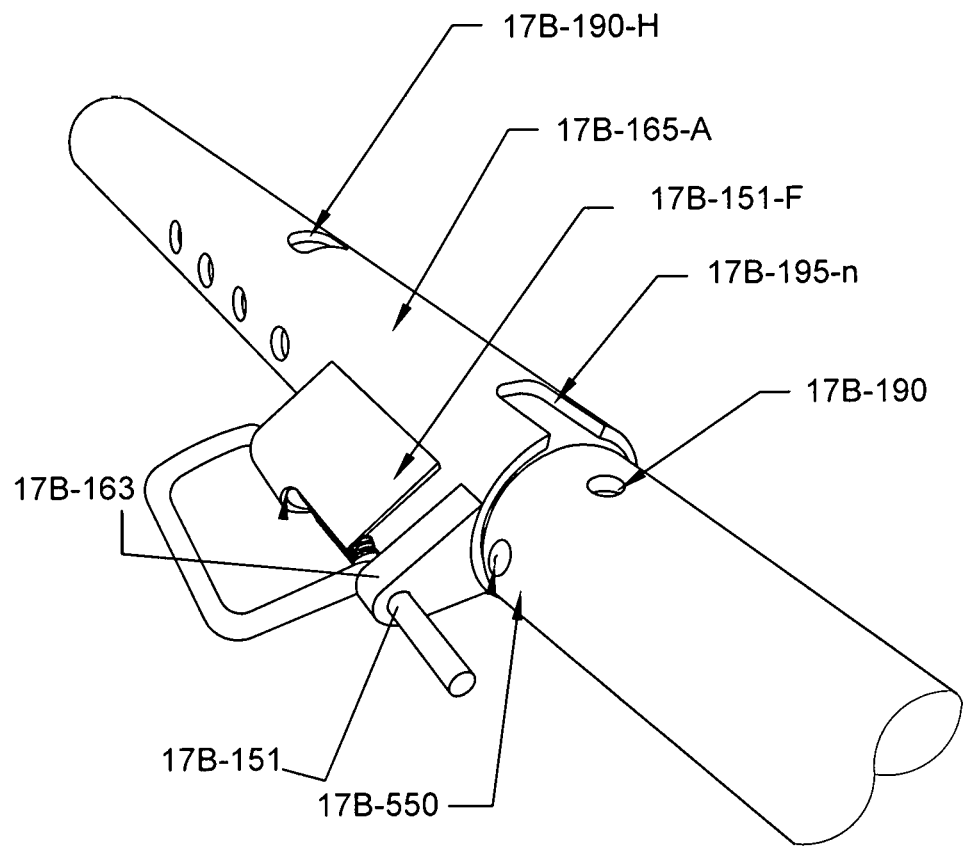

FIG. 17A shows a conventional neck and pipe in modification, in accordance with an exemplary embodiment of the present invention. FIGS. 17A and 17B afford a comparison of the conventional pipe and a pipe as modified in accordance with an exemplary embodiment of the present invention. More particularly, the pin bracket, shown in FIG. 14 14-163, for pin 14-151, shown in FIG. 14, are removed. The coupler is also removed and the bottom edge of pipe 17-165-E is shown. Above a quick release pin 17-250 is present for the quick repositioning desired with the conventional gooseneck to pipe configuration. In accordance with an exemplary embodiment, the pin 17-250 may be replaced with a bolt, nut, and washer. The ready repositioning of the pipe and coupler with the conventional trailer via the pin 17-250 may not be needed in accordance with embodiments of the present invention.

FIG. 17B. shows a partial view of an exemplary embodiment of the present invention from a top perspective during manufacture. More particularly, the pipe 165 of FIG. 17A has been modified to an exemplary embodiment 17B-165-A. The pin bracket 17B-163 has been welded on again with the pin 17B-151 set in the orientation and position shown to enable automatic locking and unlocking with use of the hydraulic coupler, in accordance with an exemplary embodiment of the present invention. The through hole of the cap 17B-550 is shown with the upper hydraulic inlet 17B-190 in hydraulic cylinder 17B-100-A. The upper hole 17B-190-H for inlet 17B-190 has been cut into the conventional pipe. And notch 17B-195-n has been cut into the conventional pipe. In accordance with an alternate embodiment, pipe 17B-165-A is newly manufactured and is not a modification of a convention pipe.

Figure 18A:
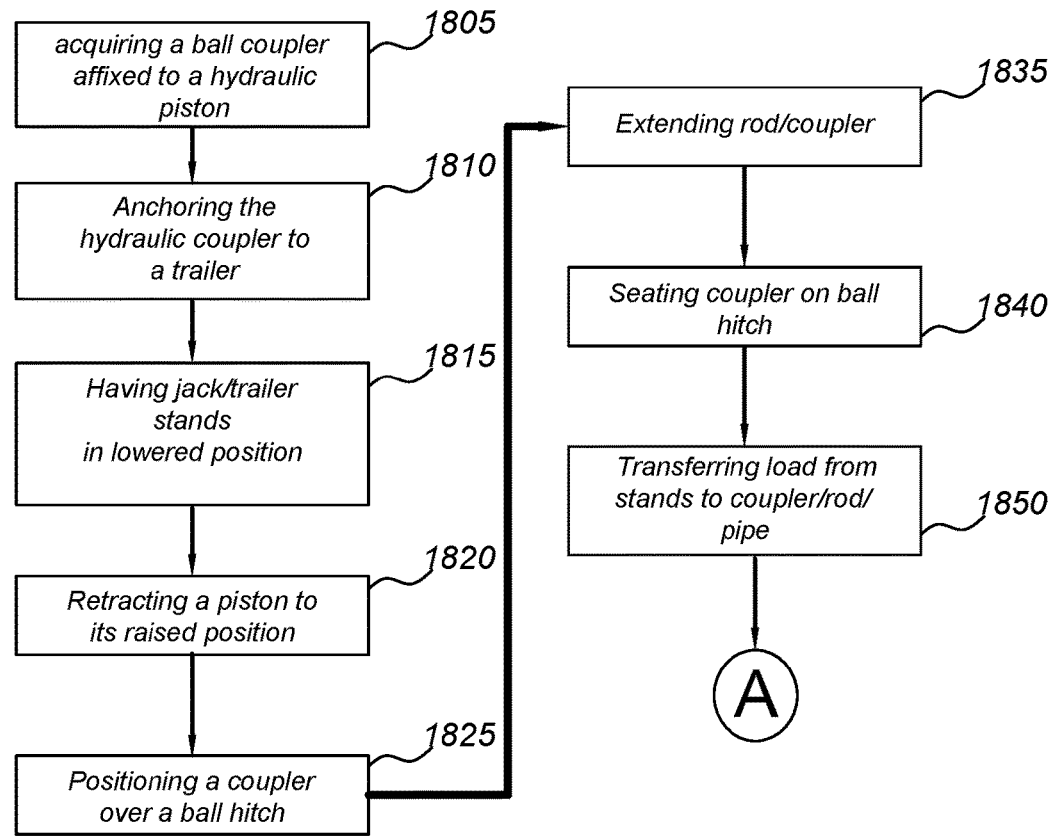
FIGS. 18A and 18B show an exemplary respective methods of lowering a ball coupler to a trailer hitch in accordance with an embodiment of the present invention.

FIG. 18A shows an exemplary method of lowering a ball coupler to a trailer hitch in accordance with an embodiment of the present invention. Turning to FIG. 18A, the exemplary method includes: acquiring a ball coupler affixed to a hydraulic piston 1805; anchoring the hydraulic coupler to a trailer 1810; securing jack-trailer stands in lowered position 1815; retracting a piston to its raised position 1820; positioning coupler over a ball hitch 1825; extending rod-coupler 1835; seating coupler on ball hitch 1840; and transferring load from stands to coupler-rod-pipe 1850.

Figure 18B:
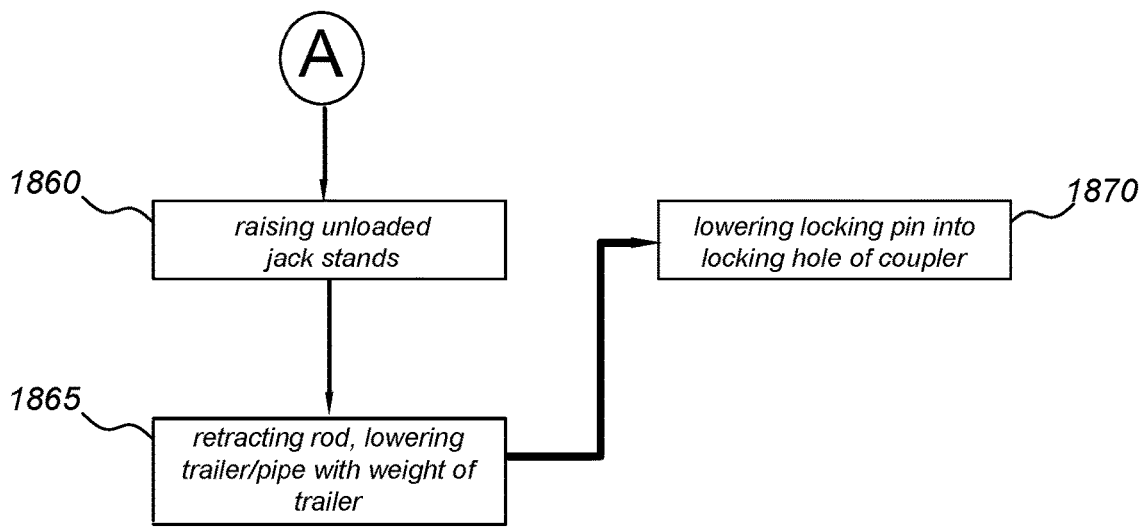

FIG. 18B shows an exemplary method of coupling a ball coupler to a trailer hitch in accordance with an embodiment of the present invention. Turning to FIG. 18B, a method of coupling a hydraulic coupler may include the methods of FIG. 18A and may further include: raising unloaded jack-trailer stands 1860; retracting the rod, lowering the trailer-pipe with the weight of the trailer on the hydraulic coupler 1865; and lowering the locking pin into the locking hole of the coupler 1870. Methods of the present invention may include any of the elements shown in FIGS. 18A and 18B and additional method elements as well.

Figure 19A:
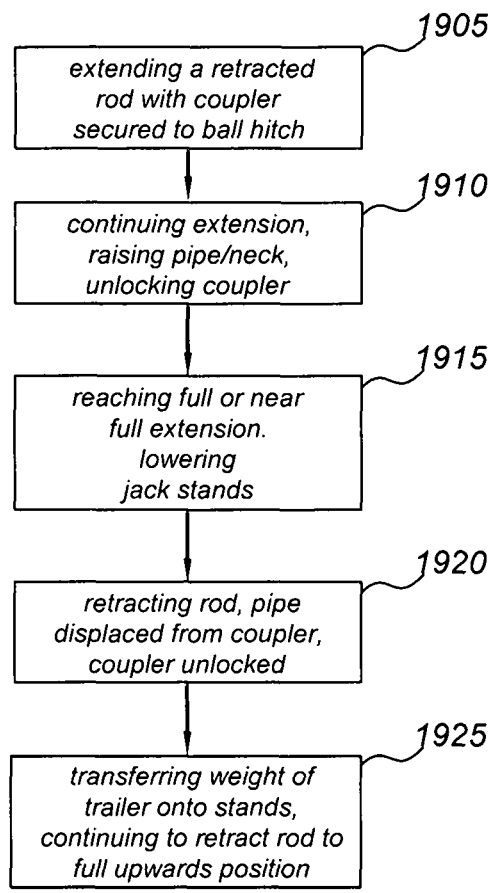
FIGS. 19A and 19B show exemplary respective methods of uncoupling a ball coupler from a ball hitch in accordance with an exemplary embodiment of the present invention.

FIG. 19A shows an exemplary method of uncoupling a ball coupler from a ball hitch in accordance with an exemplary embodiment of the present invention. Turning to FIG. 19A, the exemplary method includes: extending a retracted rod with coupler secured to ball hitch 1905; continuing extension, raising pipe-neck, unlocking coupler 1910; reaching full or near full extension, lowering jack stands 1915; retracting rod, pipe displaced from coupler, coupler unlocking 1920; and transferring weight of trailer onto stands, continuing to retract rod to full upwards position 1925.

Figure 19B:
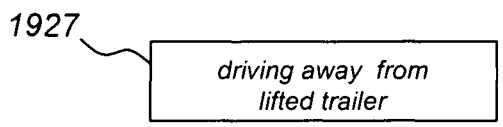

FIG. 19B shows a method of uncoupling a hydraulic coupler from ball hitch, in accordance with an exemplary embodiment of the present invention. The method of uncoupling a hydraulic coupler in accordance with an exemplary embodiment of the present invention may further include driving away from the trailer on stands with the coupler clearing the ball hitch 1927. Methods of the present invention may include any of the elements shown in FIGS. 19A and 19B and additional method elements as well.

FIG. 20A shows a side view of a coupler and its modification, in accordance with an exemplary embodiment of the present invention. Coupler 20-131-C is shown with lock 20-131-L and dome 20-131-d. A top height 20-131-h of approximately 0.25 inches is taken off the top of the coupler dome to yield a top flat surface 20-131-F. This top flat surface affords a good connection to the bottom of the rod, rod not shown. In accordance with an exemplary embodiment enough height of the dome is removes such that the coupler does not extend into the rod side of the bushing, FIG. 7B. The modified dome has a height 20-131-ht. In accordance with an exemplary embodiment, height 20-131-ht is near 1.25 inches. A top surface of the coupler base 20-712-C will mate with the coupler side of bushing 900 at opening 712.

Figure 20B:
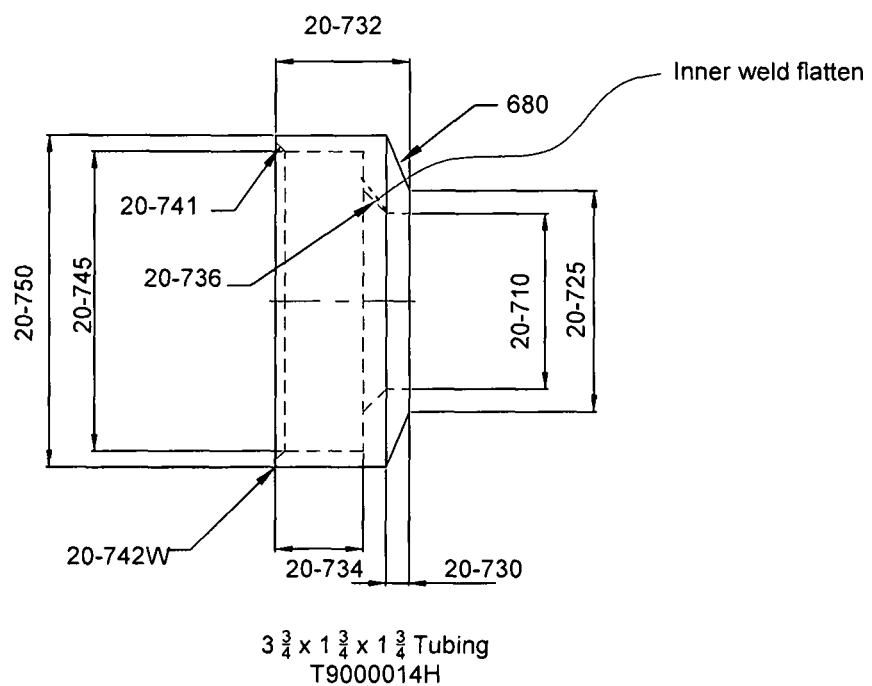
FIG. 20B shows melded aspects of the bushing in accordance with an exemplary embodiment of the present invention.

FIG. 20B shows the welded aspects of the bushing 900. In accordance with an exemplary embodiment, the height 20-732 is 1.50 inches. A chamfer 20-741 is used from an inner wall 740 of the coupler side, and is ⅛ inch at 45 degrees, in accordance with an exemplary embodiment. An inner wall slope 20-736 ¼ inch at 45 degrees, in accordance with an exemplary embodiment. The bushing has an outer-most rod side diameter 20-725, and is 2.5 inches in accordance with an exemplary embodiment. And has a bushing coupler side outer most diameter 20-750, where the latter is greater than the former. In accordance with an exemplary embodiment coupler side outer diameter 20-750 is 3.75 inches. The coupler side of the bushing has an outer ¼ inch weld around the circumference of the bushing on the outer wall of the bushing and a top of the coupler, not shown, interface. An inner diameter on the coupling side is 3.375 inches, in accordance with an exemplary embodiment. Also shown are heights 20-732 and 20-734, which may be 1.5 inches and 1 inch, respectively, in accordance with an exemplary embodiment. An inner weld flatten is also shown and when coupled spans the gap from a flattened coupler top to a bottom side of the rod.

Figure 21A:
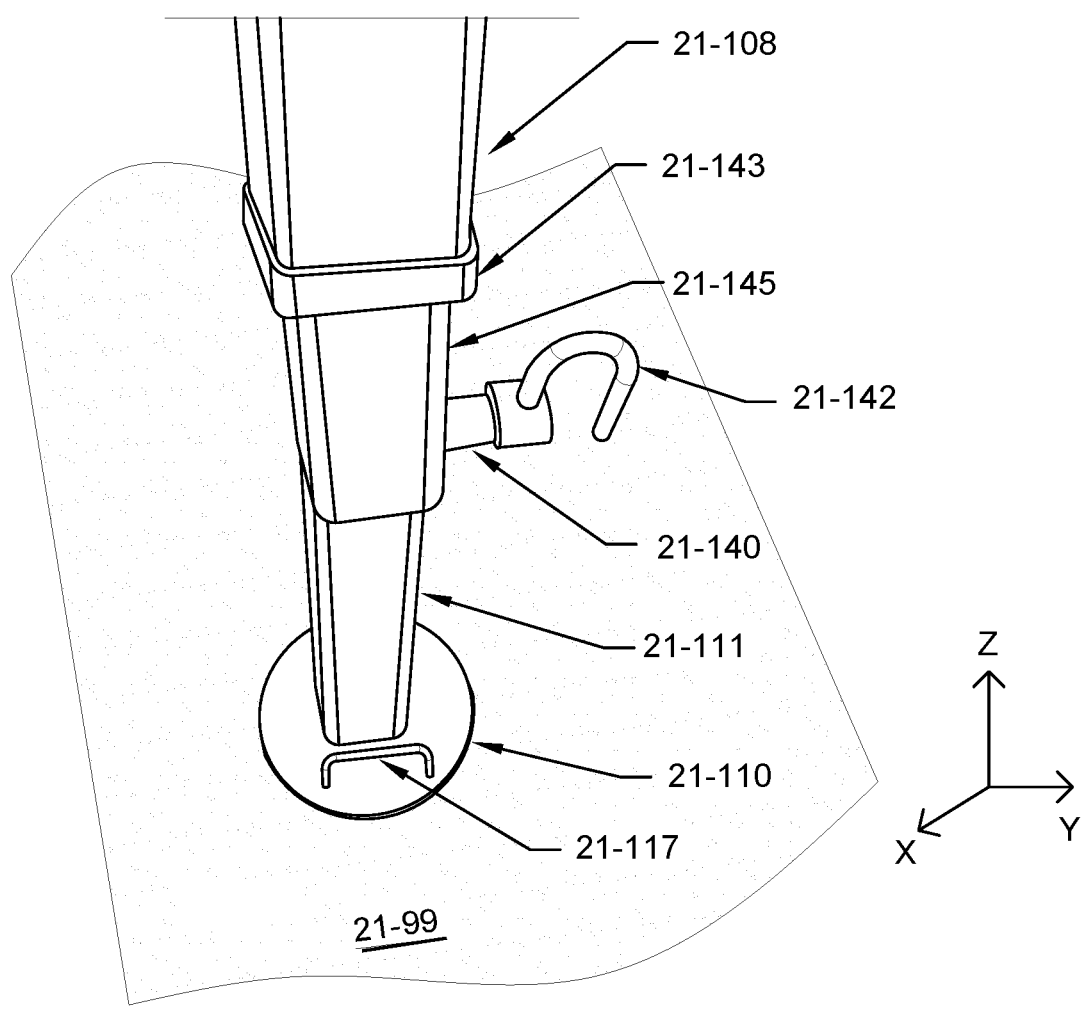
FIGS. 21A-21N illustrate a coupling phase sequence of a gooseneck trailer to a truck in progress, in accordance with an exemplary embodiment of the present invention.
Figure 21B:
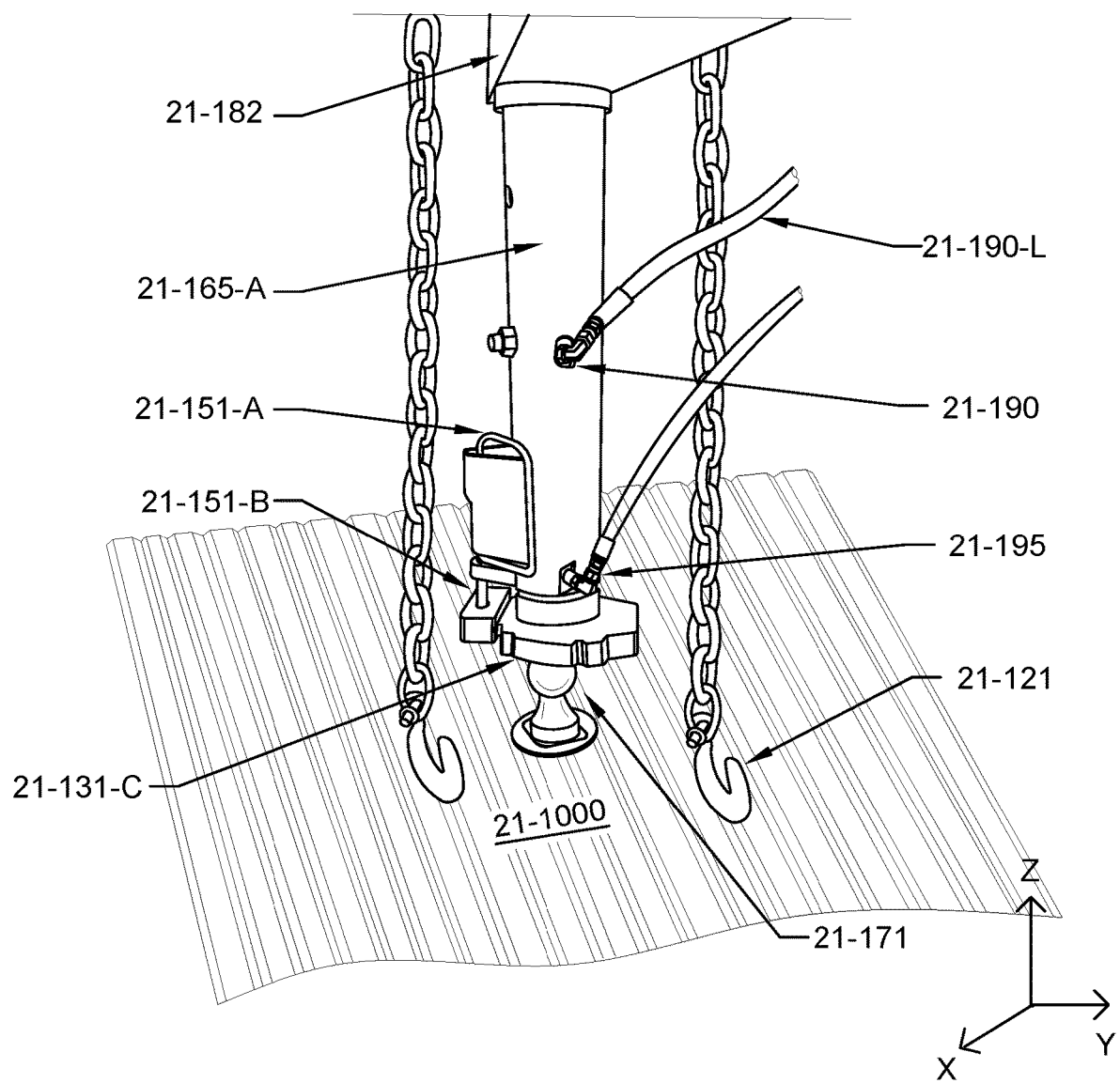
Figure 21C:
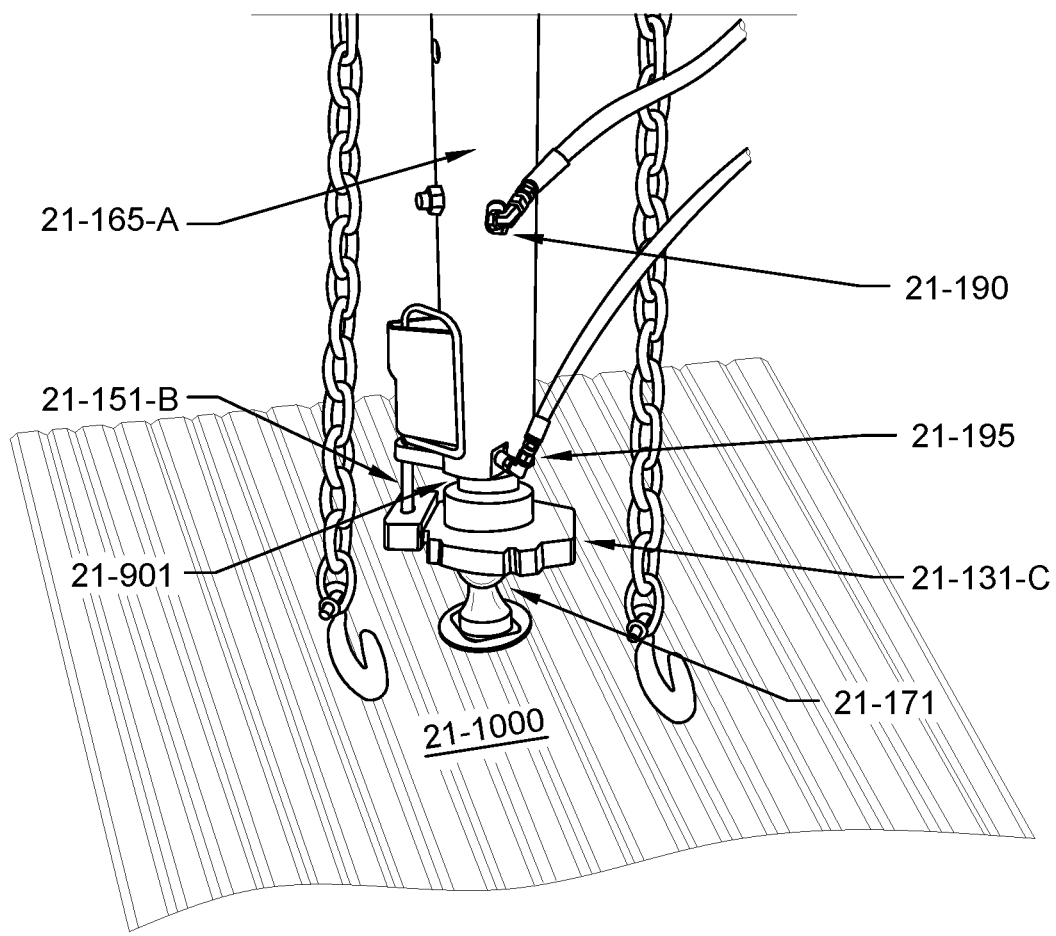
Figure 21D:
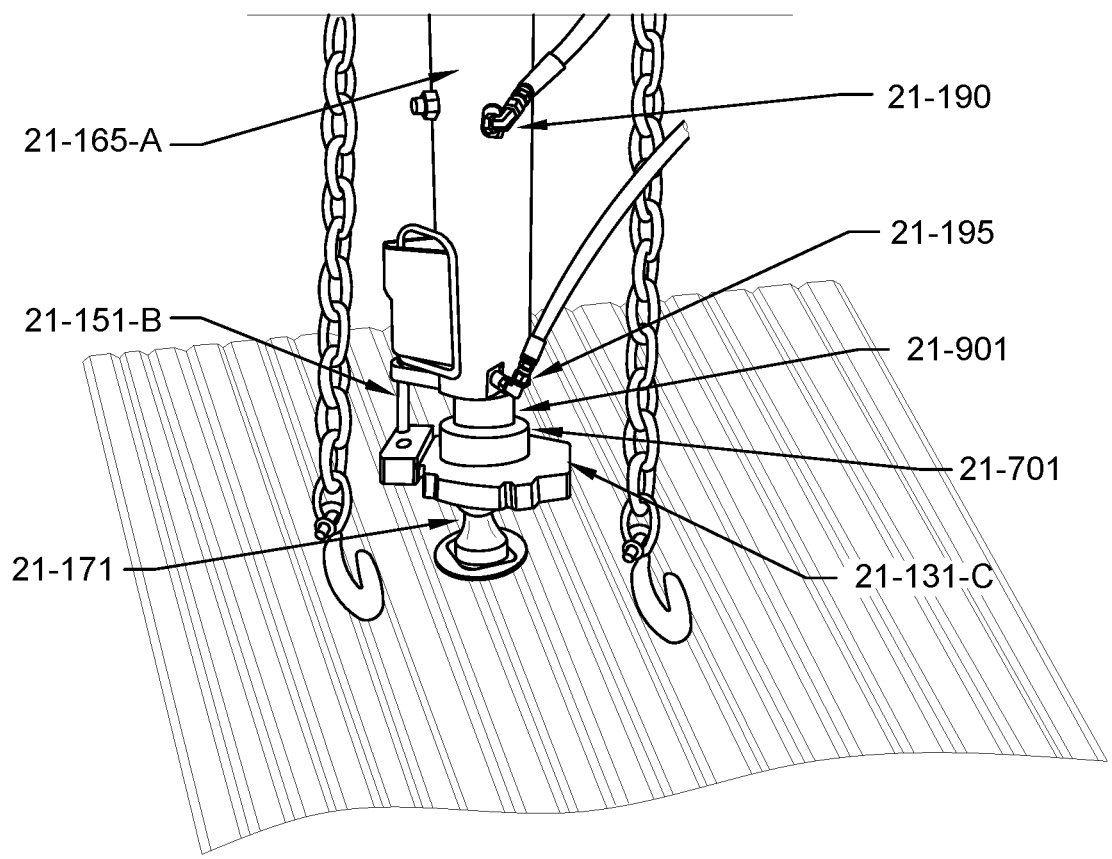
Figure 21E:
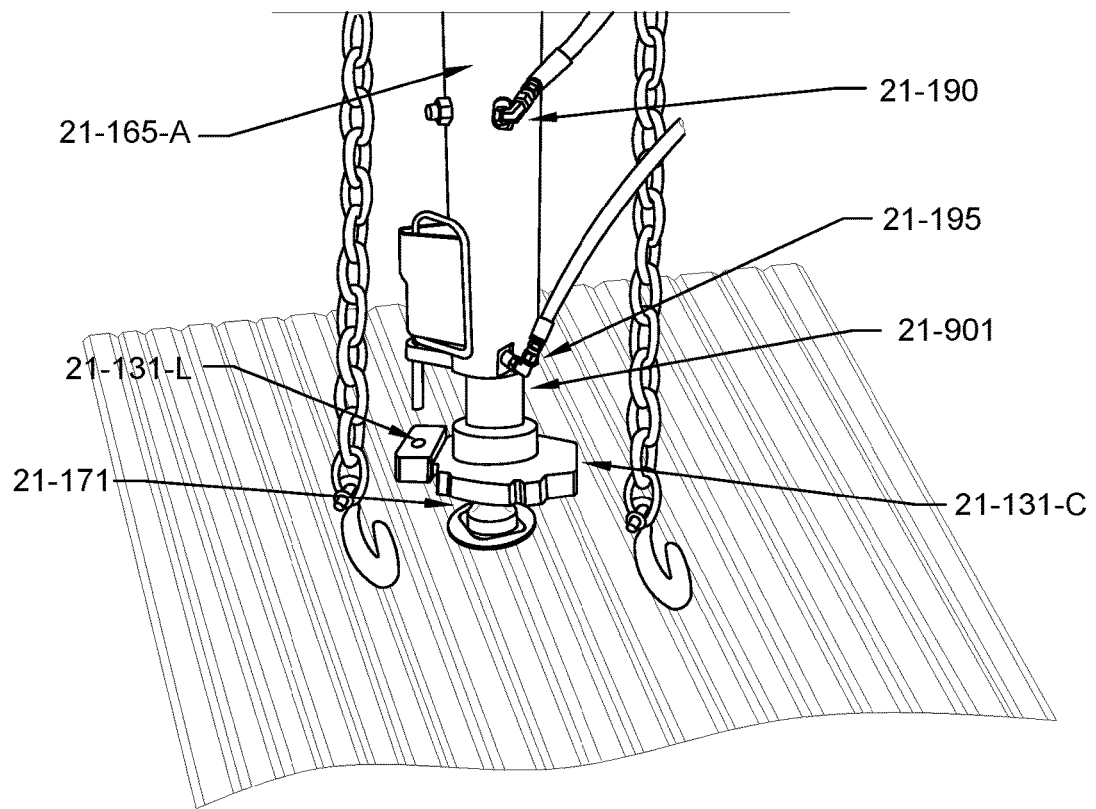
Figure 21F:
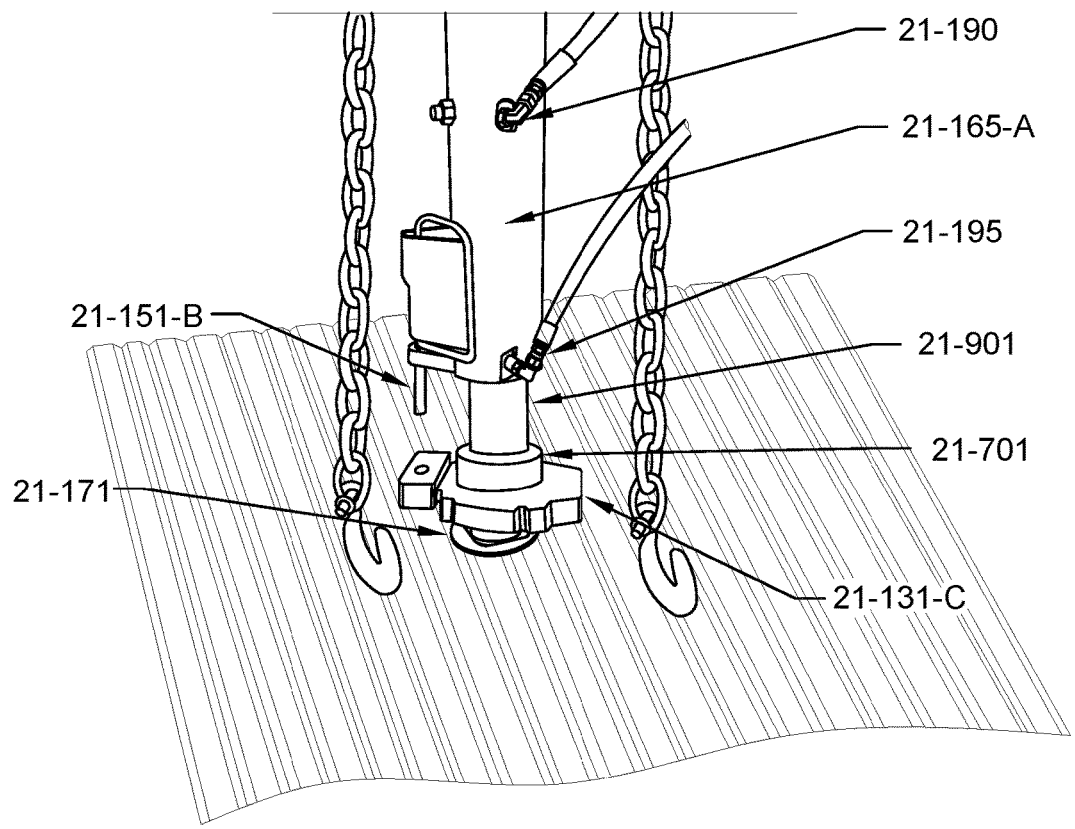
Figure 21G:
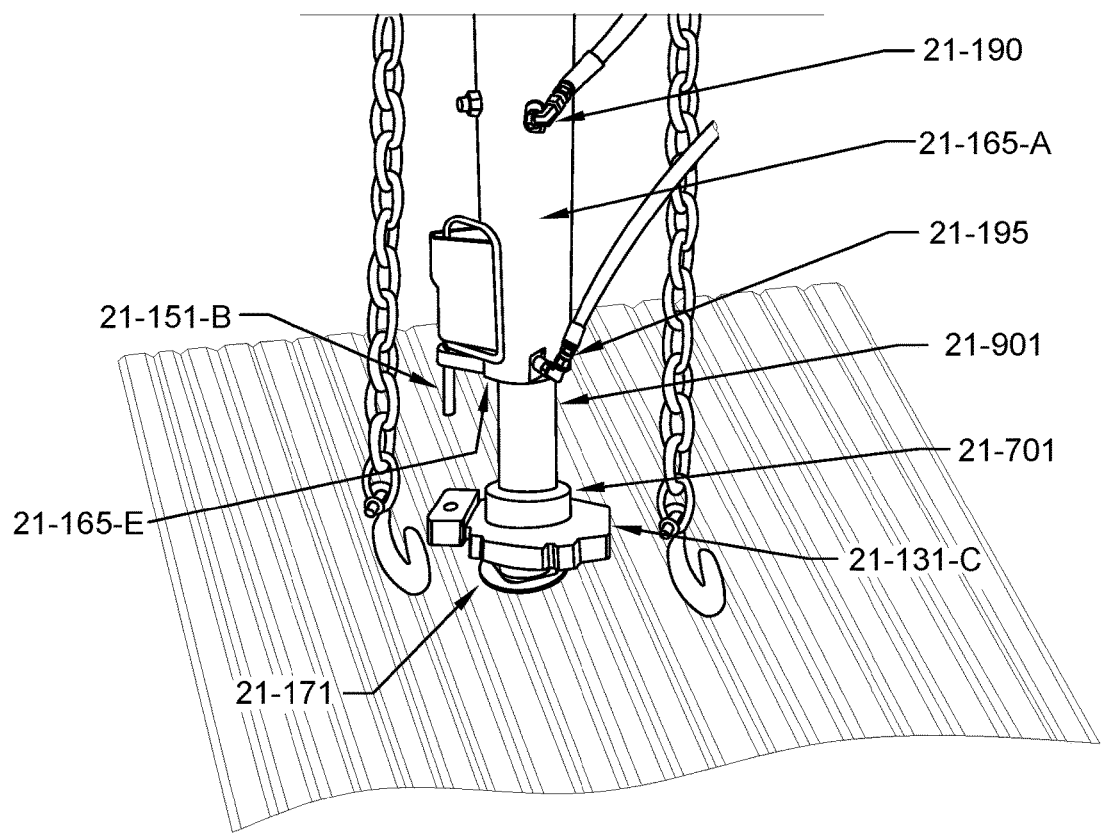
Figure 21H:
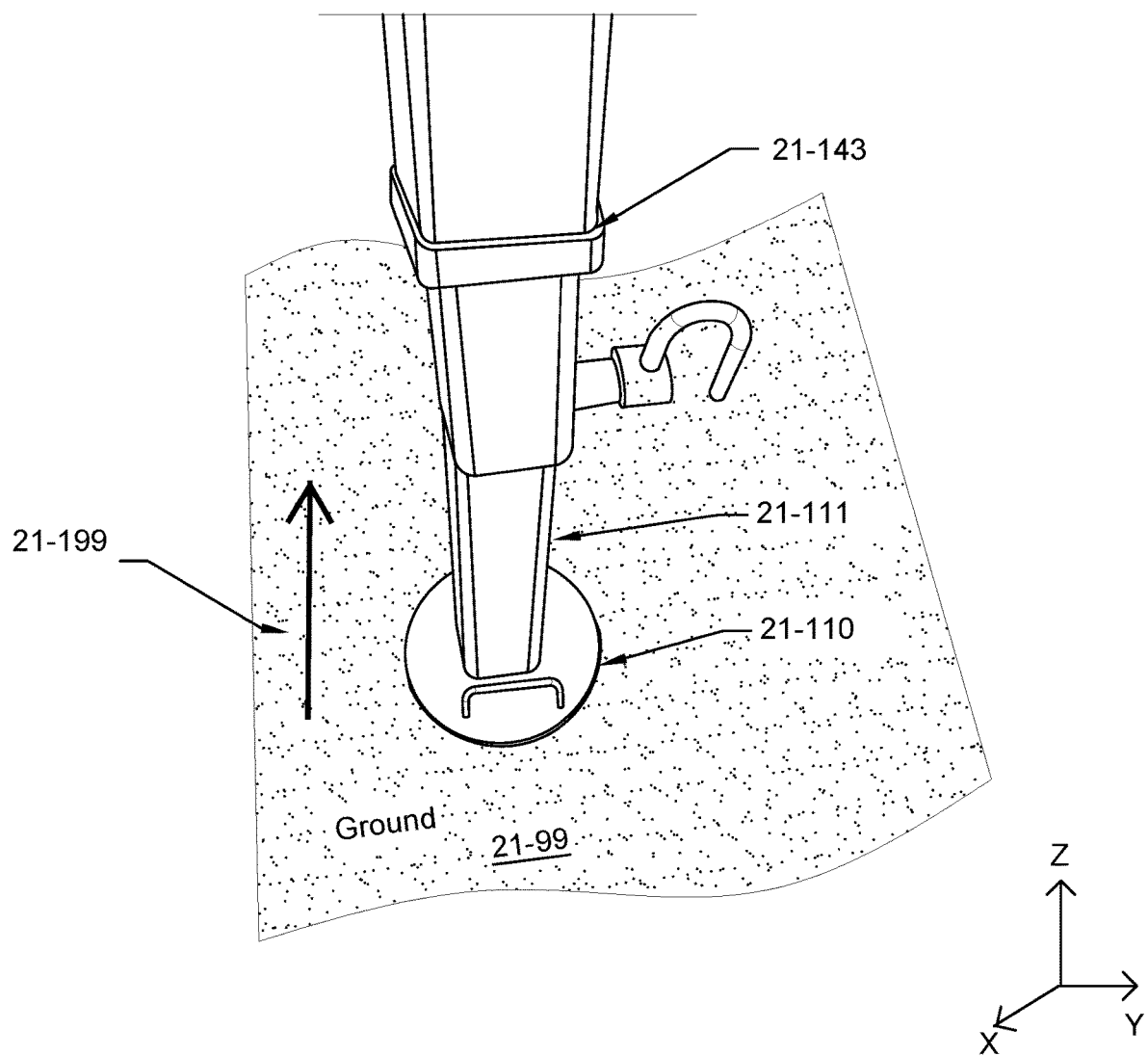
Figure 21I:
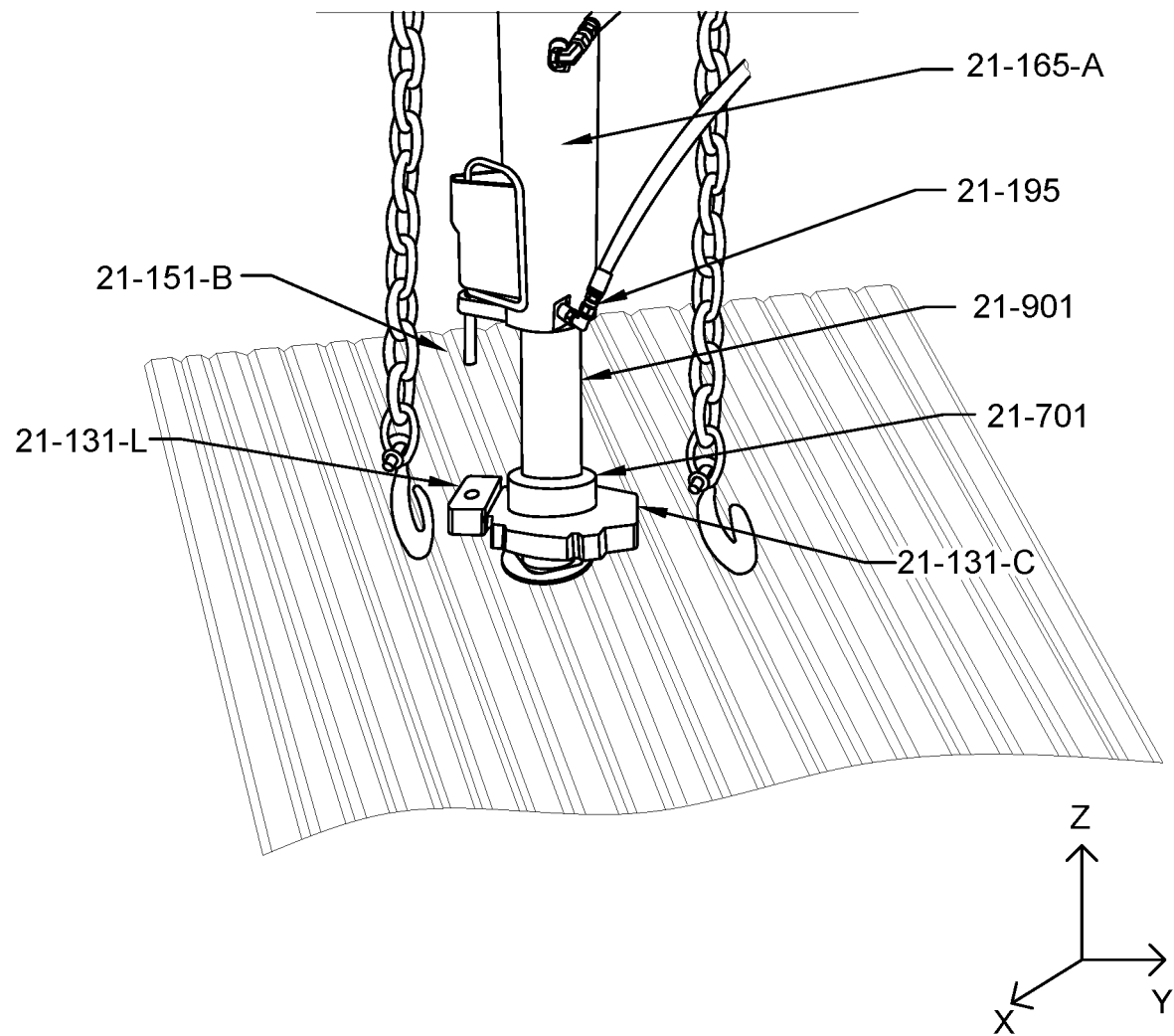
Figure 21J:
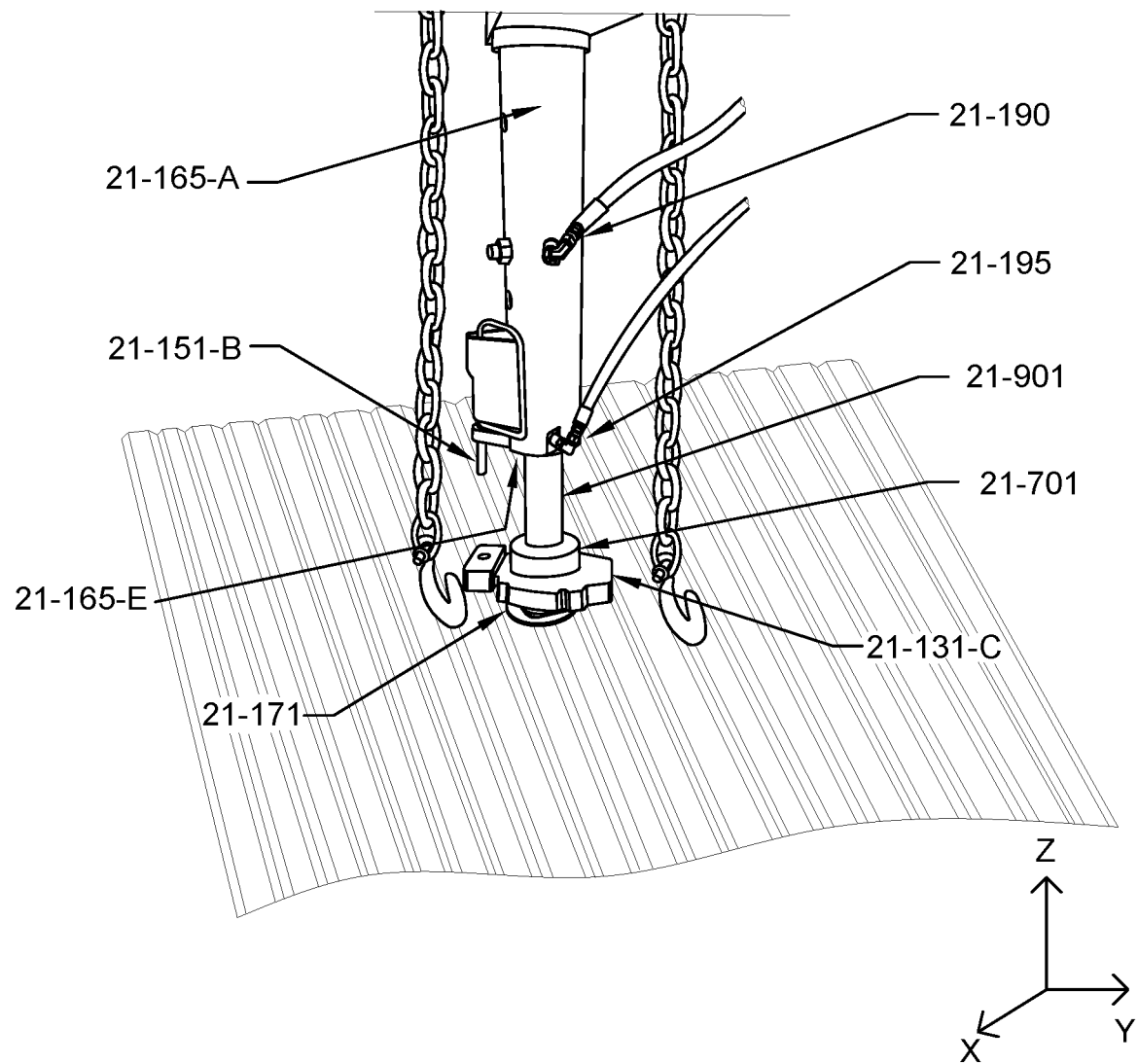
Figure 21K:
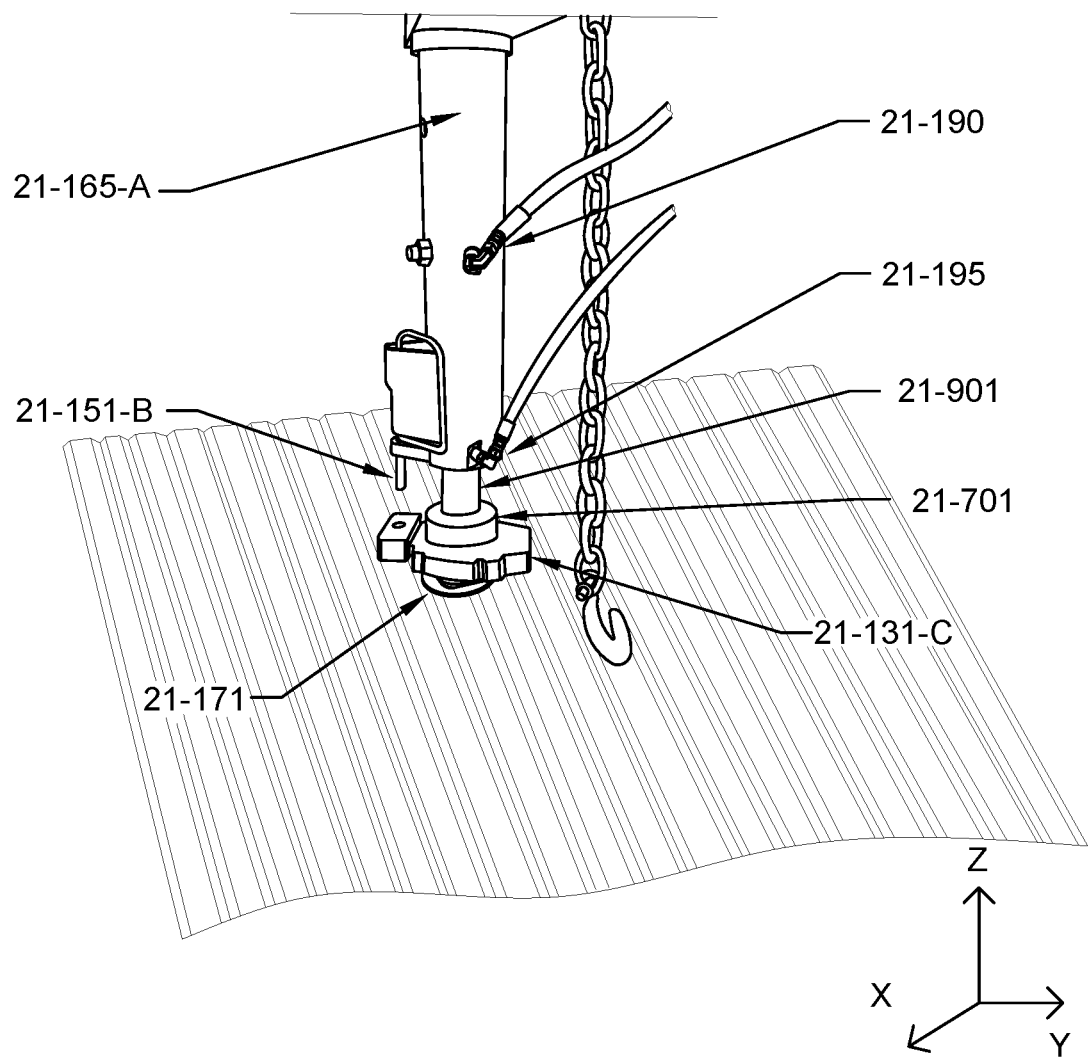
Figure 21L:
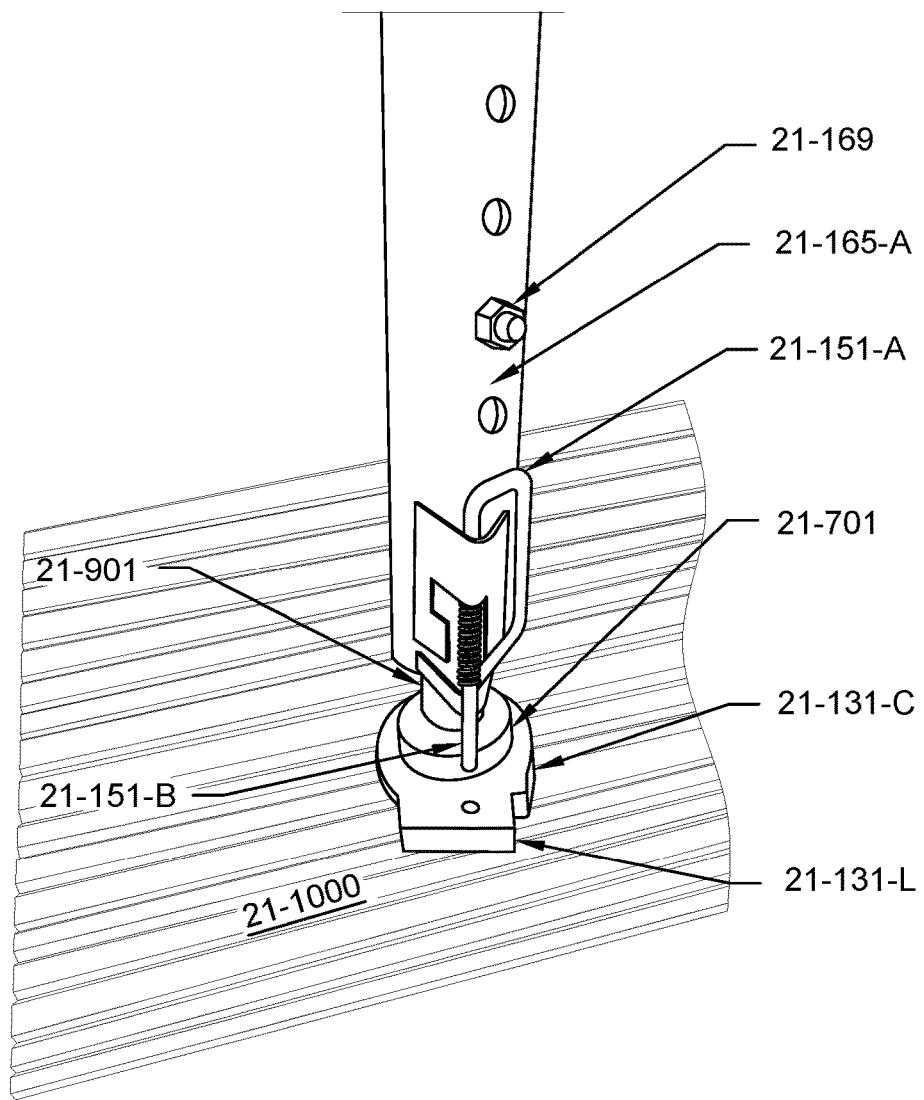
Figure 21L:
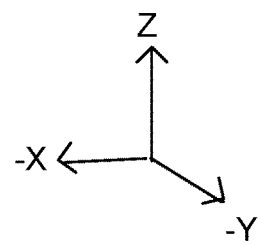
Figure 21M:
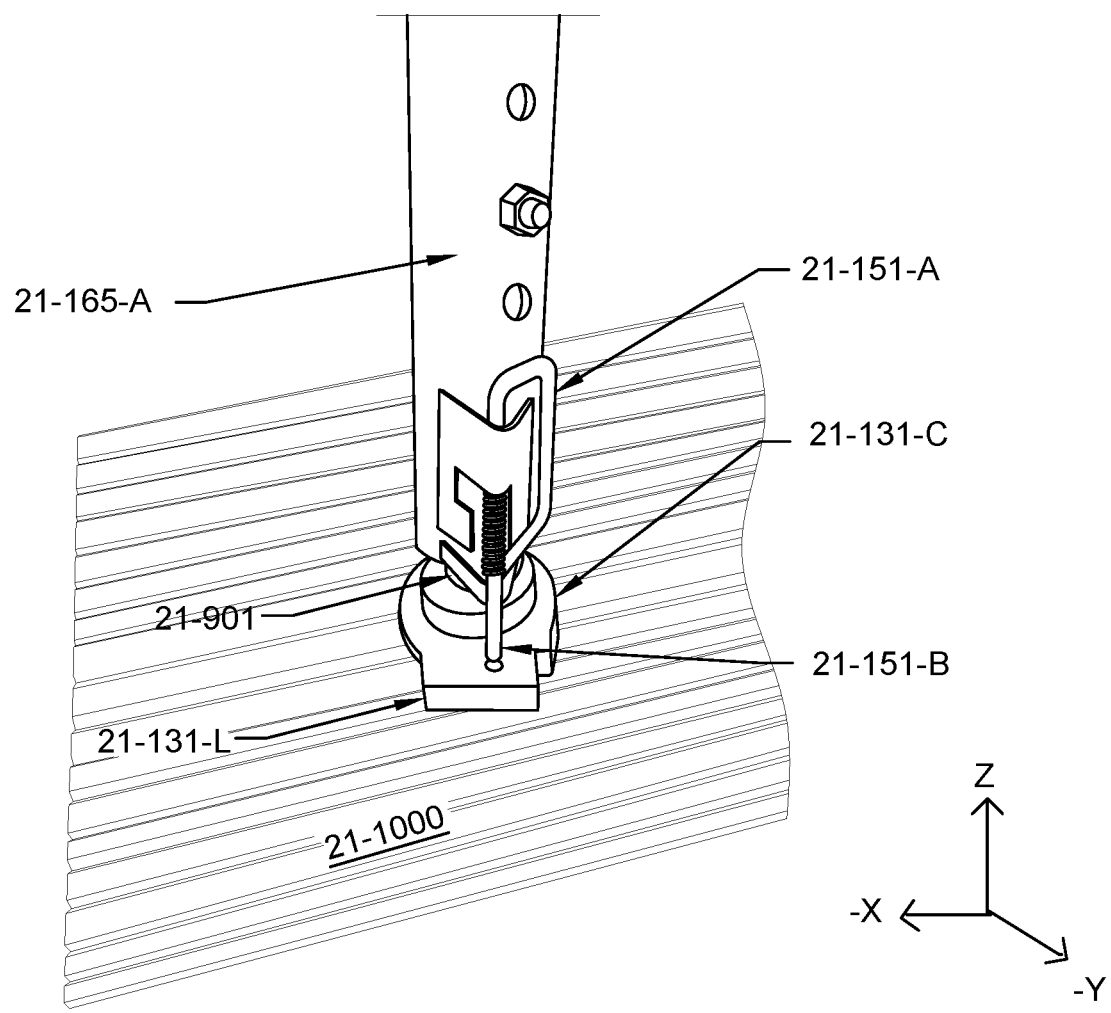
Figure 21N:
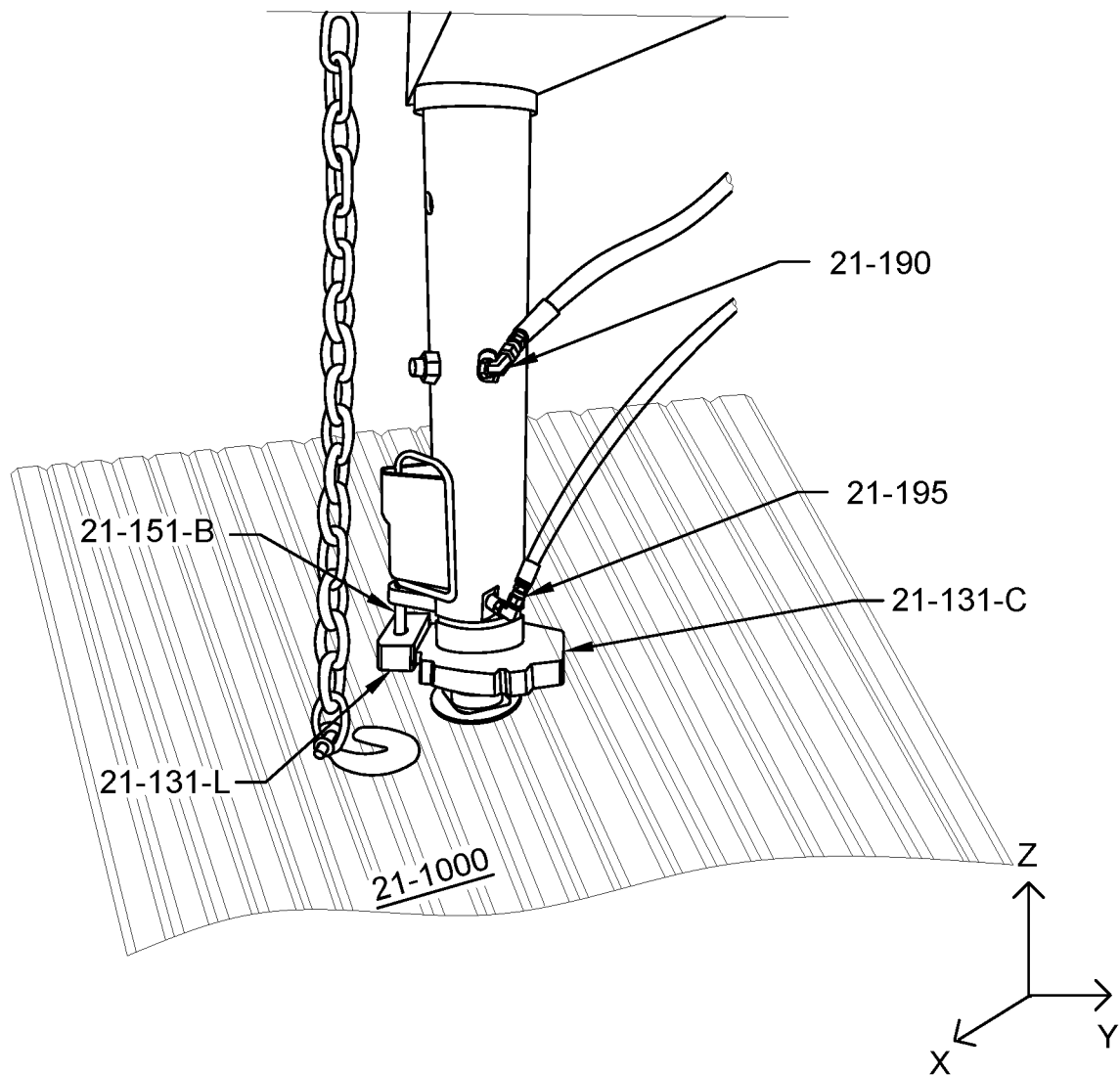

FIGS. 21A-21N illustrate a coupling phase sequence of a gooseneck trailer to a truck in progress, in accordance with an exemplary embodiment of the present invention. Turning to FIG. 21A, the load of the trailer is on the jack stands, where the foot 21-110 is on the ground 21-99 in the −Z direction. The trailer jack stands may be conventional, in accordance with embodiments of the present invention. A handle 21-117 is shown on the foot 21-110. Leg 21-111 is lowered with release of handle 21-142 from base 21-145 which is affixed to base 21-108 at coupling 21-143.

Turning to FIG. 21B, the hydraulic goose neck is in the back of the truck 21-1000 centered over the ball hitch 21-171. From the bottom, −Z direction, coupler 21-131-C is centered over the ball 21-171. Locking pin 21-151-B is lowered an in its locked position. The conventional pin handle 21-151-A is turned and secured into the locking position. A lower hydraulic port 21-195 is shown beneath an upper hydraulic port 21-190. And connect to port 21-190 is hydraulic line 21-190-L. The rod, not shown is in its full retracted position. Up top, +Z direction, the gooseneck 21-182 of the trailer can be seen with the pipe 21-165-A of an exemplary embodiment of the present invention attached thereto. FIG. 21B shows the hydraulic coupler in an initial coupling state. Chains 21-121 rest on the bed 21-1000.

Turning to FIG. 21C, the coupler 21-131-C has lowered slightly, −Z, over the ball 21-171. The rod 21-901 has extended about an inch and is just discernable. The pin 21-151-B has risen slightly above its locking dock in coupler 21-131-C. At this point the coupler 21-131-C, shown for example in FIG. 10 is unlocked and the lock moves freely by its spring. The pin 21-151-B is in the top half or higher of the locking dock. Also shown are pipe 21-165-A and fluid ports 21-190 and 21-195. At this stage, the weight of the trailer is still on the jack stands, FIG. 21A.

Turning to FIG. 21D, the locking pin 21-151-B has lifted above the coupler, and pin's corresponding locking dock of the coupler 21-121-C. The rod 21-901 is more visible in this stage. The rod 21-901 has extended further from the hydraulic cylinder, cylinder not shown, in turn, the coupler 21-131-C attached to the rod 21-901 via the bushing 21-701 is further beneath the pipe 21-165A, where the pipe is stationary through FIGS. 21A-21D. Ports 21-190 and 195 are shown. Hydraulic fluid is being pumped into the top of the cylinder via port 21-190.

Turning to FIG. 21E, the rod 21-901 continues to extend, lowering the coupler 21-131-C further down, −Z, over the ball hitch 21-171. The pin 12-151-B is well above the locking dock 21-131-L of the coupler 21-131-C now. The coupler is completely down over the ball hitch at this stage. The rod is near full extension in the −Z direction and can extend further should the truck and ball hitch lower. Also shown are the pipe 21-165-A and ports 21-190, 21-195. At this stage the inner side of the coupler 21-131-C is atop an exterior surface of the ball hitch 21-171. The weight of the trailer is transferring or transferred to the Neck-pipe-cylinder-rod-coupler chain. The rod continues to extend, transferring the load off of the jack stands, FIG. 21A, and the pipe 21-165-A rises as the rod extends beyond load contact of the interior coupler 21-131-C to the ball hitch 21-171. The pin 21-151-B can be seen at a greater separation in the +Z direction from the locking dock of the coupler 21-131-C as the pin is affixed to the rising pipe 21-165-A.

Turning to FIG. 21F, the rod 21-901 is nearer full extension, the coupler 21-131-C is just a bit lower −Z over the ball hitch 21-171. The pin 21-151-A is still higher, +Z, displaced from its locking dock of the coupler 21-131-C. Ports 21-190 and 21-195 are shown.

Turning to FIG. 21G, the rod 21-901 is now fully extended. The pin 21-151-B is at its greatest height +Z relative to the coupler 21-131-C. Ports 21-190 and 21-195 are shown. The bottom edge of the pipe 21-165-E is at its farthest +Z distance from bushing 21-701. The position of the pin 21-151-B in the XY plane is constant throughout the coupling process. The weight is now fully on the ball-coupler-rod-tube-pipe-neck series and the foot of the stands raises off the ground.

Verification of load transfer is made by a check with jack stands. Turning to FIG. 21H, The jack stands 21-111 are still lowered. The foot 21-110 is above +Z ground 21-99. And the stands 21-111 can now be raised 21-199, +Z, where base 21-143 is a trailer's base and neither rises nor lowers with raising of the stands 21-111.

FIG. 21I shows the beginning of the rod retraction in the coupling phase. With the load off the stands, the rod 7-901 retracts and the pipe 21-165-A lowers. Pin 21-151-B approaches −Z the locking dock 21-131-L a little bit. The coupler 21-131-C remains loaded atop the ball hitch and unlocked.

FIG. 21I shows the rod 21-901 further retracting during the load bearing coupling phase. The pin 21-151-B and pipe edge 21-165-E further approach −Z the bushing 21-701 and coupler 21-131-C. Hydraulic fluid is pumped into lower port 21-195. Upper port 21-190 can be seen in this view.

FIG. 21K shows additional rod 21-901 retraction in the load bearing coupling phase. The pin 21-151-B continues to approach −Z the coupler 21-131-C. The coupler 21-131-c is not locked about the hitch 21-171. The pipe 21-165-A continues to lower −Z. Lower 21-195 port and upper hydraulic port 21-190 are shown. Hydraulic fluid continues to be pumped into the lower port 21-195.

FIG. 21L shows the rod 21-901 further retracted in the load bearing coupling phase. The view is from the pin perspective, −Y. Pin 21-151-B is above the locking dock 21-131-L of the coupler 21-131. Less rod 21-901 height +Z is visible. The pin handle 21-151-A remains secured in the locked position. The nut 21-169 securing the through bolt through the cap and pipe 21-165-A is shown. The bushing 21-701 attaching the rod 21-901 to the coupler 21-131-C is shown as is the truck bed. 21-1000.

FIG. 21M shows the pin 21-151-B further approaching −Z the locking dock 21-131-L of the coupler 21-131-C with further retraction of the rod. The rod 21-901 now barely visible. The pin remains in its initial position relative to the XY plane and moves only in the Z direction. Similarly, the orientation of the coupler 21-131-C also remains constant throughout the coupling process with respect to the XY plane. The pin handle 21-151-A remains in its locked position. Pipe 21-165-A is shown.

FIG. 21N shows pin 21-151-B fully inserted into locking dock 21-131-L. This causes the coupler 21-131-C to lock about the ball hitch as desired. Hydraulic ports 21-190 and 195 are shown.

Figure 22A:
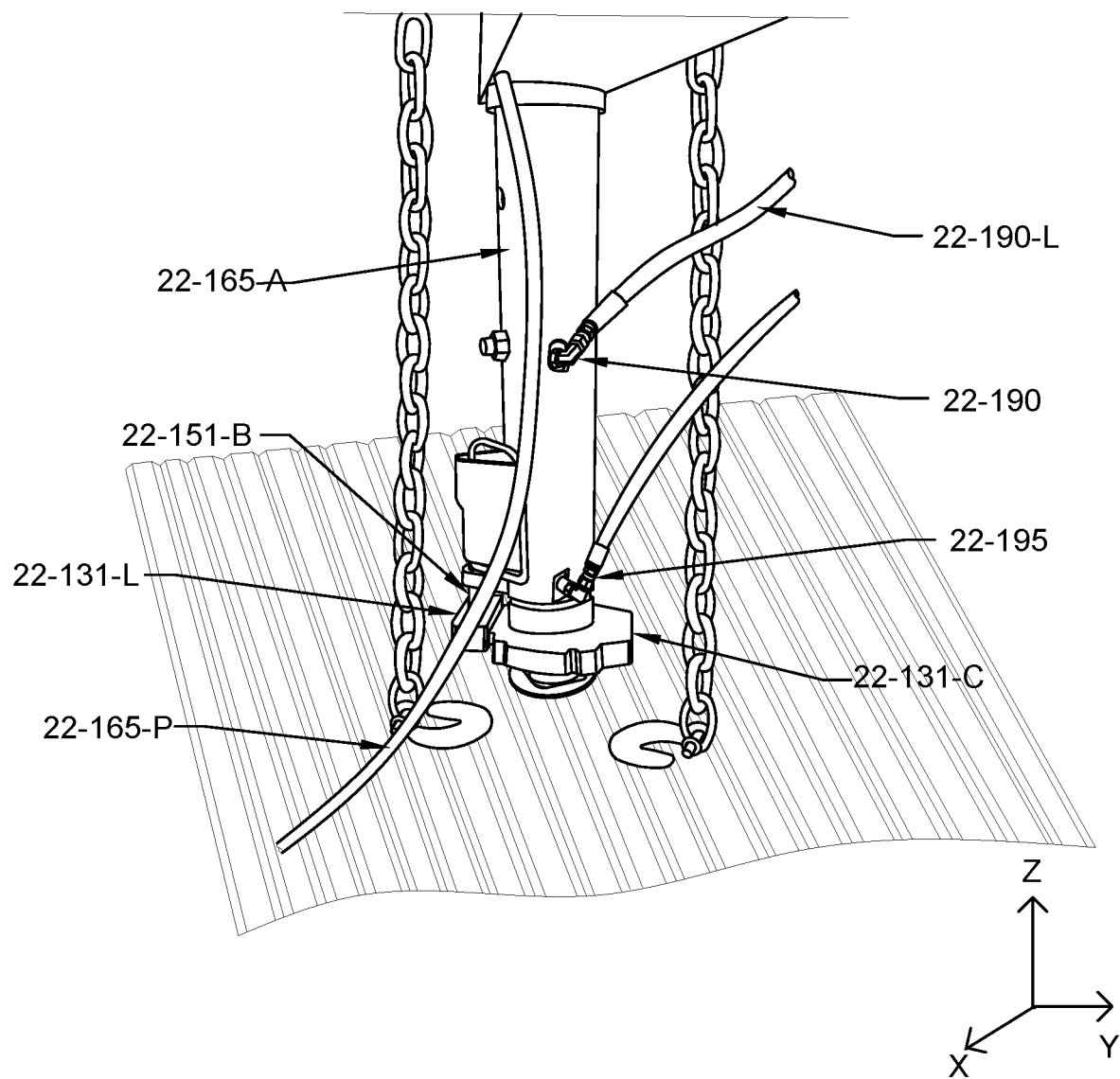
FIGS. 22A-22I illustrate an uncoupling phase sequence of a gooseneck trailer from a truck in progress, in accordance with an exemplary embodiment of the present invention.

FIGS. 22A-22I illustrate an uncoupling phase sequence of a gooseneck trailer from a truck in progress, in accordance with an exemplary embodiment of the present invention. Turning to FIG. 22A, the load is on the hydraulic coupler 222-131-C and the parts upwards +Z therefrom. The coupler 22-131-C is locked, the pin 21-151-B is inserted in the locking dock 22-131-L. A power line 22-165-A-P is shown in the foreground. The pipe 22-165-A is shown. The jack stands are not lowered and do not bear load, stands not shown. Extension of the rod, rod not visible in this view, begins. The trailer begins to rise pushing down on the ball-coupler-rod-pipe structural chain.

Figure 22B:
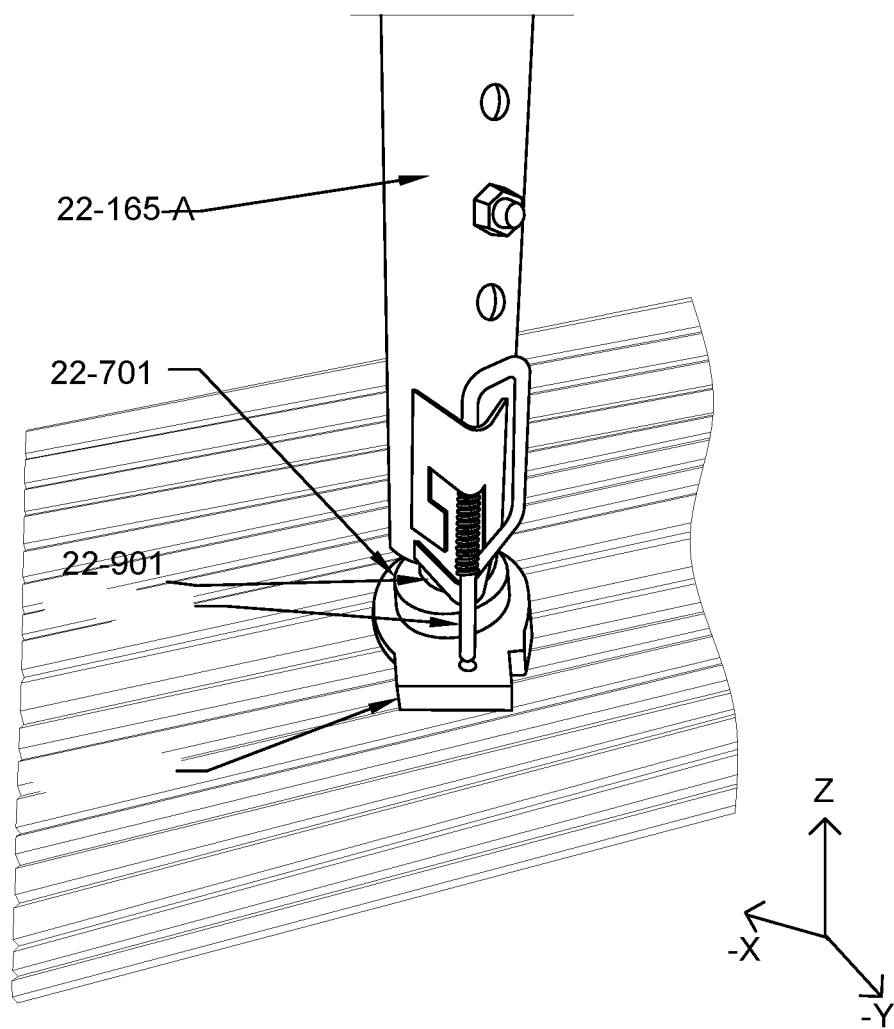

FIG. 22B shows a perspective from −Y. The pin 22-151-B has risen with extension of the rod 22-901 just above the locking dock 21-131-L of the coupler. The rod 22-901 is now just visible above the bushing 22-701 in this view. The pipe 22-165-A is also shown.

Figure 22C:
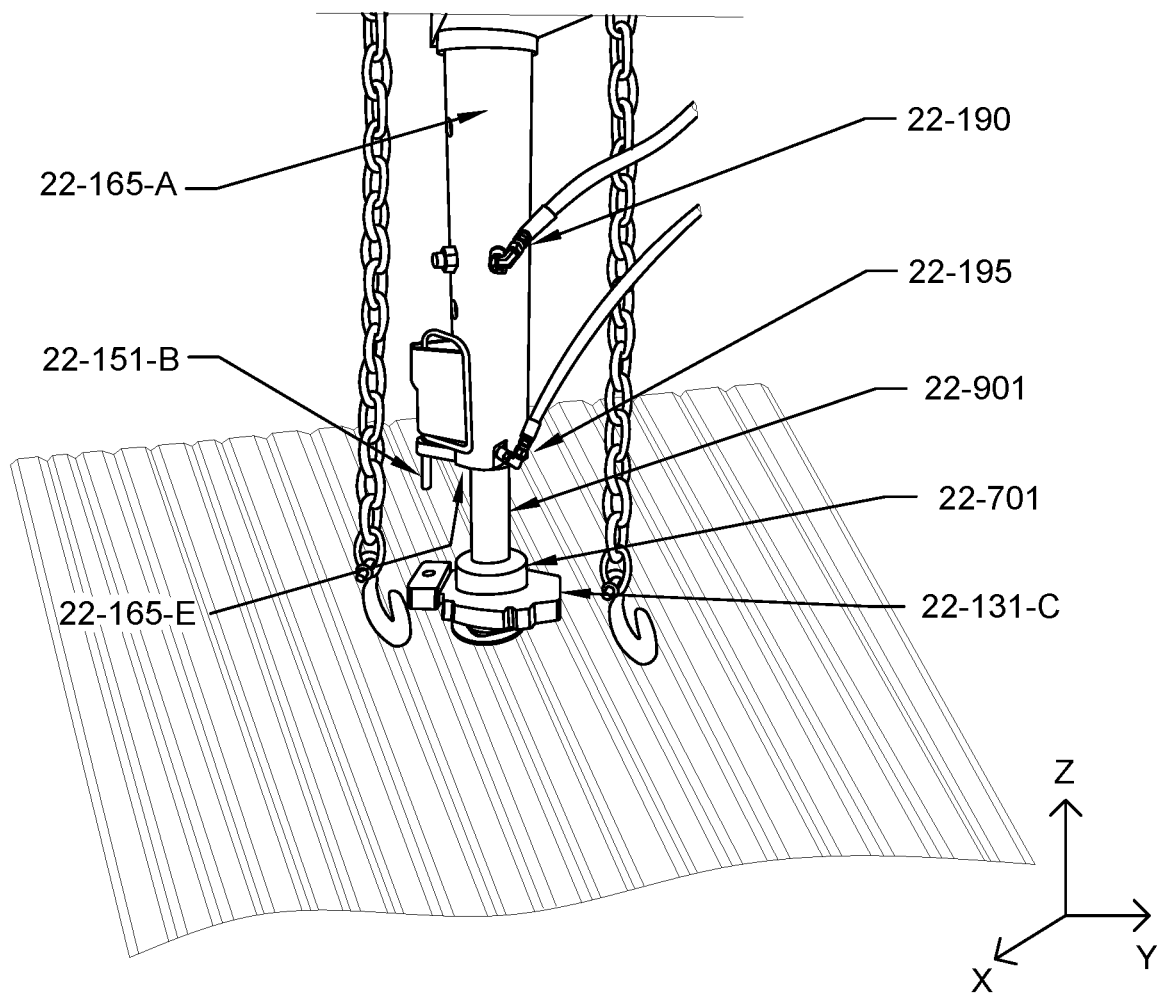

FIG. 22C shows the rod 22-901 well extended from the hydraulic cylinder. The pin 22-151-B is high above +Z the locking dock 22-131-L. The bottom edge 22-165-A-E of the pipe is displaced +Z from the bushing 22-701. The coupler 22-131-C is unlocked but resting, bearing load, on the ball hitch. The hydraulic ports 22-190 and 22-195 are shown. Hydraulic fluid is being pumped into port 22-190. The rod is nearly fully extended in this view and the neck of the trailer is rising.

Figure 22D:
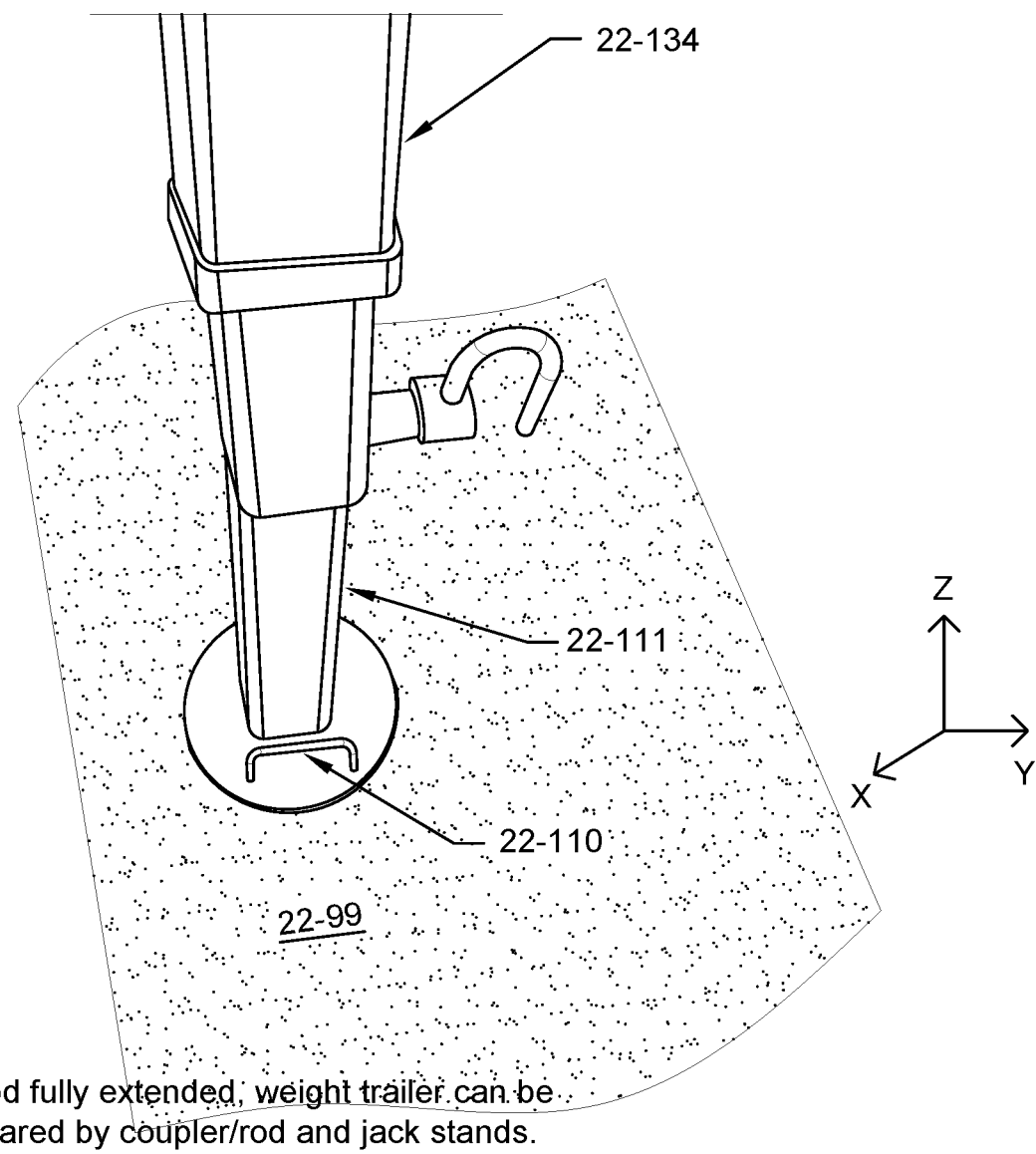

Referring to FIG. 22D, with the rod fully extended in the uncoupling phase, the jack stands 22-111 can be lowered −Z to the ground 22-99. The foot 22-110 of the stand and the base 22-134 of the trailer are shown.

Figure 22E:
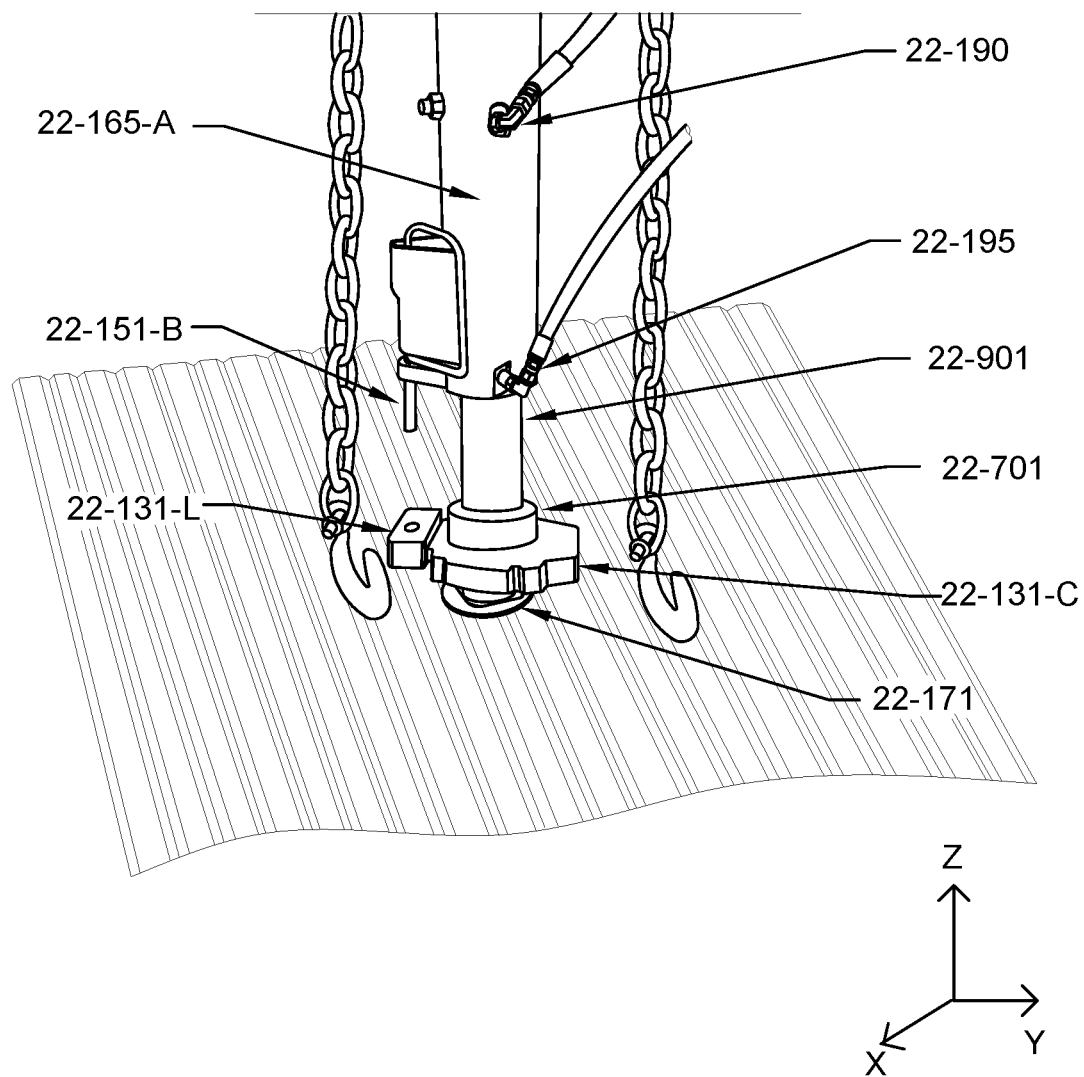

FIG. 22E shows the uncoupling phase continuing. The rod 22-901 is shown fully extended and retraction of the same begins. The coupler 22-131-C is unlocked from the ball hitch 21-171. The pin 22-151-B is well above +Z the locking dock 22-131-L of the coupler 22-131-C. The upper and lower hydraulic ports 22-190 and 22-195 are shown. With rod retraction, fluid is pumped into lower port 22-195. The pipe 22-165-A is shown.

Figure 22F:
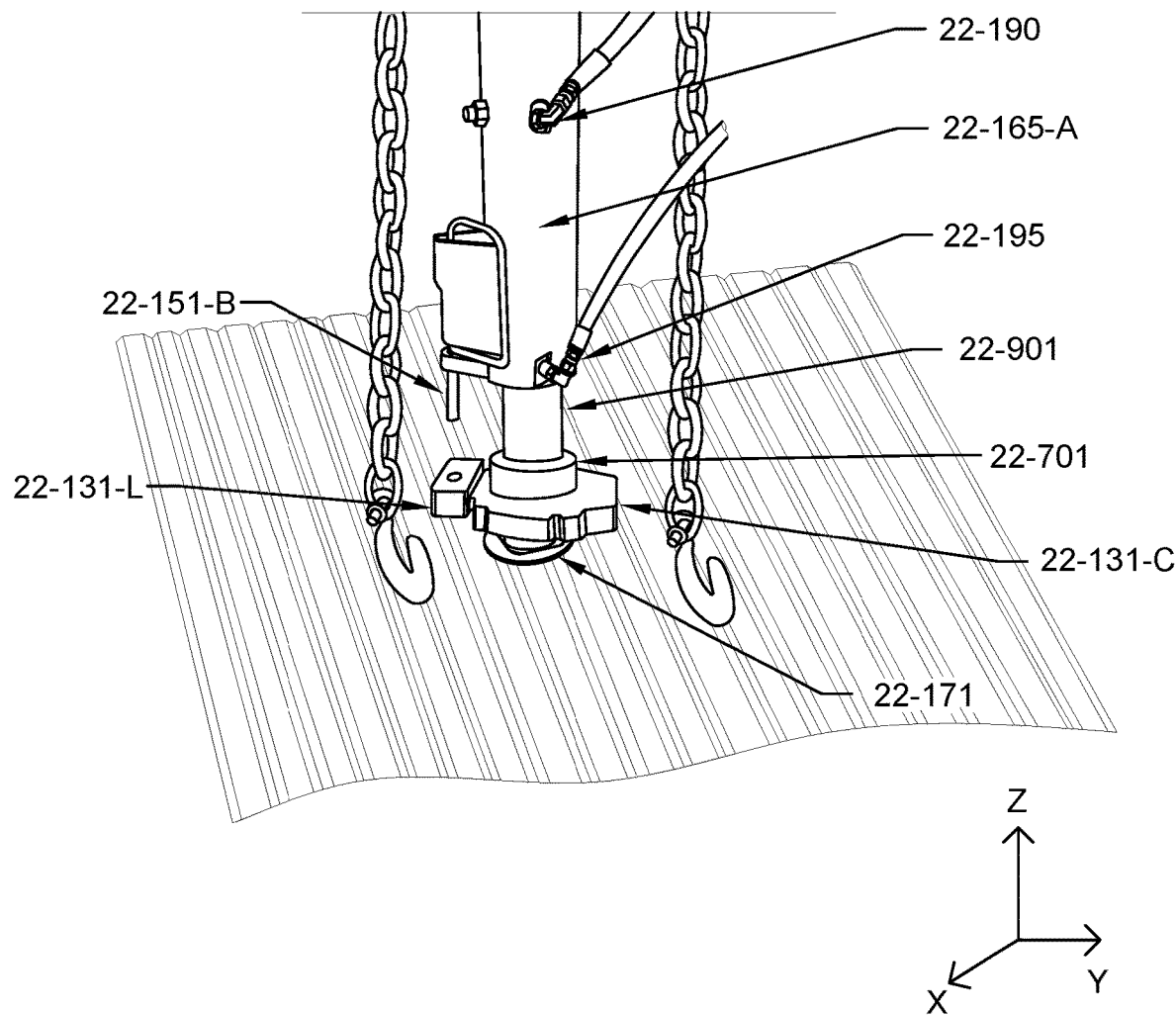

FIG. 22F shows the uncoupling phase continuing as the rod 22-901 continues to retract −Z into the hydraulic cylinder. The weight of the trailer is now transferred to the lowered jack stands. Displacement +Z of the pipe to the coupler 22-131-C decreases. The pin 22-151-B remains at its +Z position relative to the XY plane. The ball hitch 22-171 becomes more visible. Ports 22-190 and 22-195 are shown. The locking dock 22-131-C maintains its orientation in the XY plane. The pipe 22-165-A is shown.

Figure 22G:
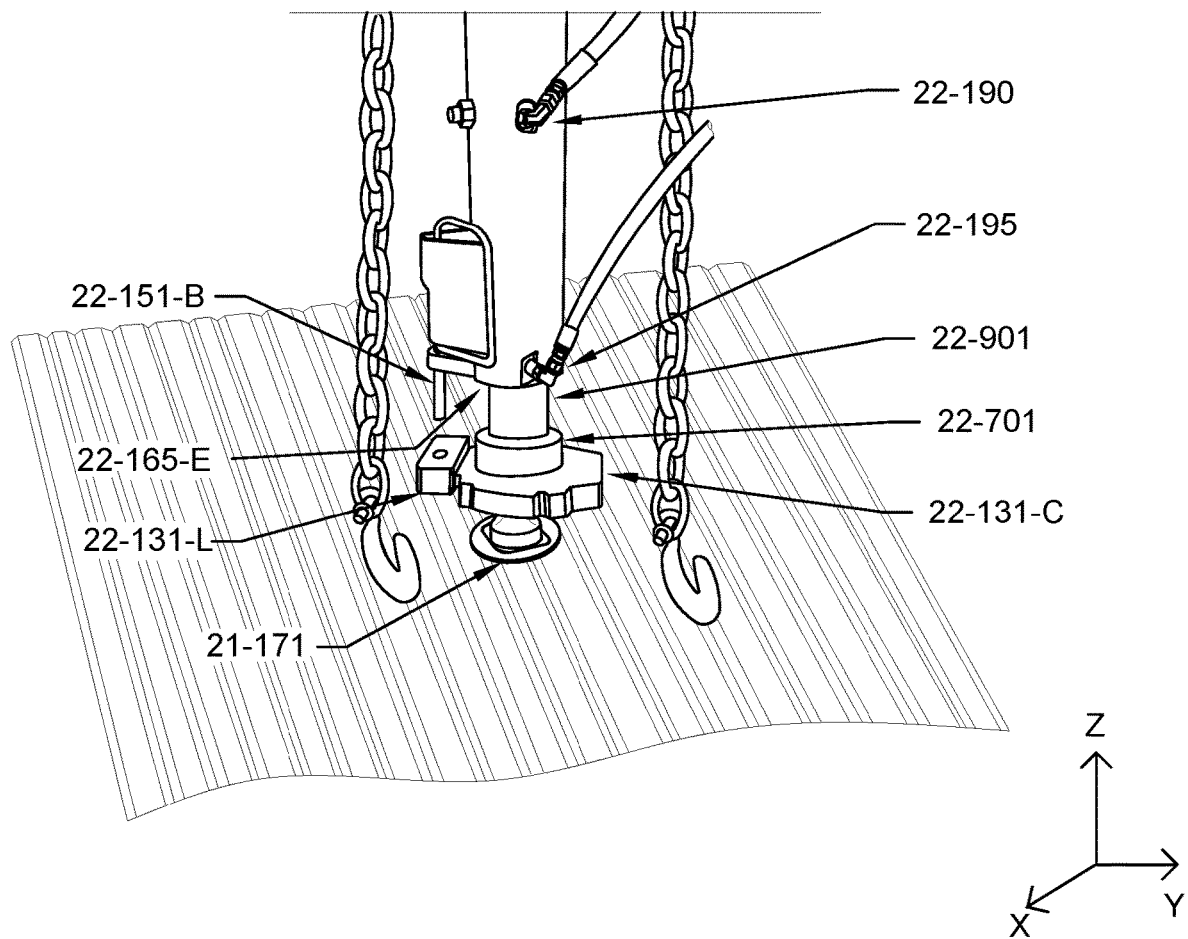

Uncoupling continues as shown in FIG. 22G. The rod 22-901 continues to retract bring the unloaded coupler 22-131-C upwards +Z to the pipe edge 22-165-E. The locking dock 22-131-L raises towards the pin 22-151-B. The bushing 22-701 and ports 190 and 195 are shown. Hydraulic fluid is pumped into the lower port 22-195. More of the ball hitch 22-171 is now visible as the truck holds steady and the coupler 22-131-C rises +Z.

Figure 22H:
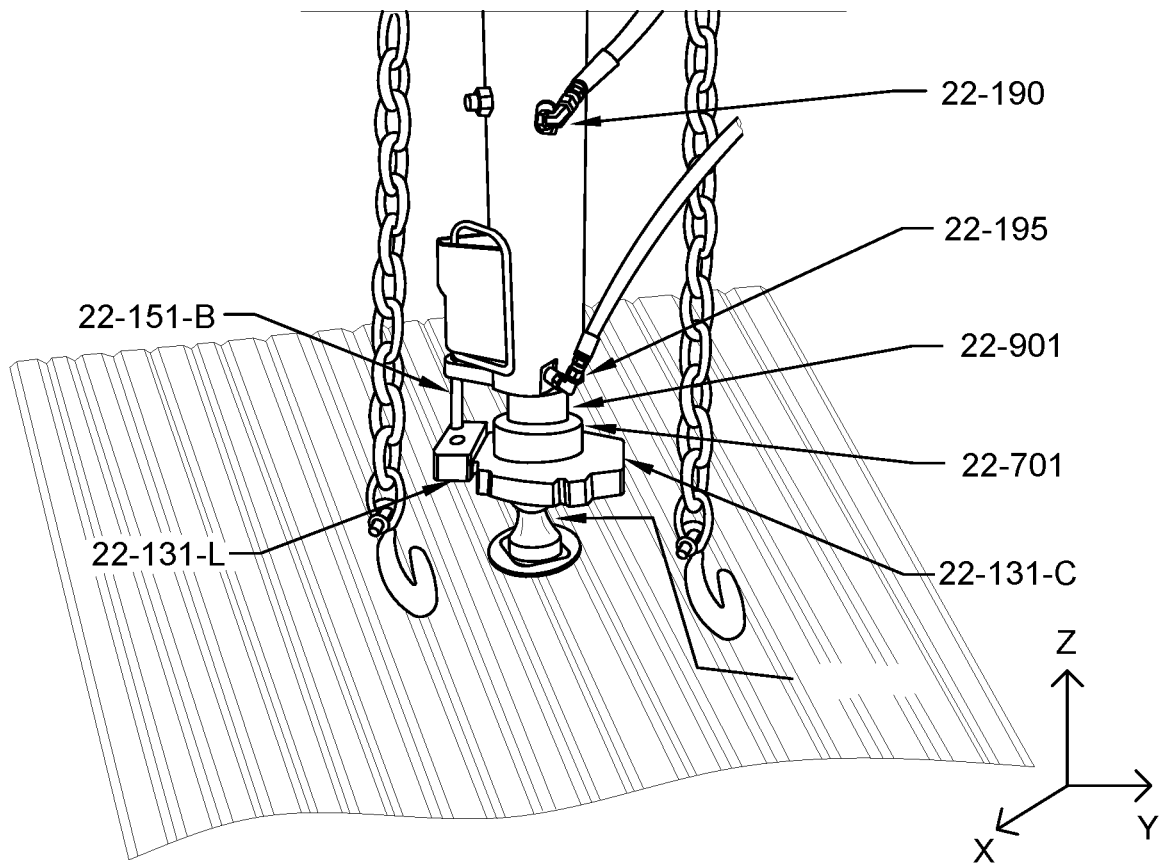

Turning to FIG. 22H, the uncoupling phase continues further with the rod 22-901 further retracting. The bushing 22-701 is shown. More of the ball hitch 22-171 is visible in this view with the rising of the coupler 22-131-C. The locking dock 22-131-L approaches +Z the pin 22-171, the pin in a steady position relative to both the Z direction and to the XY plane. Upper and lower ports 190 and 195 are shown.

Figure 22I:
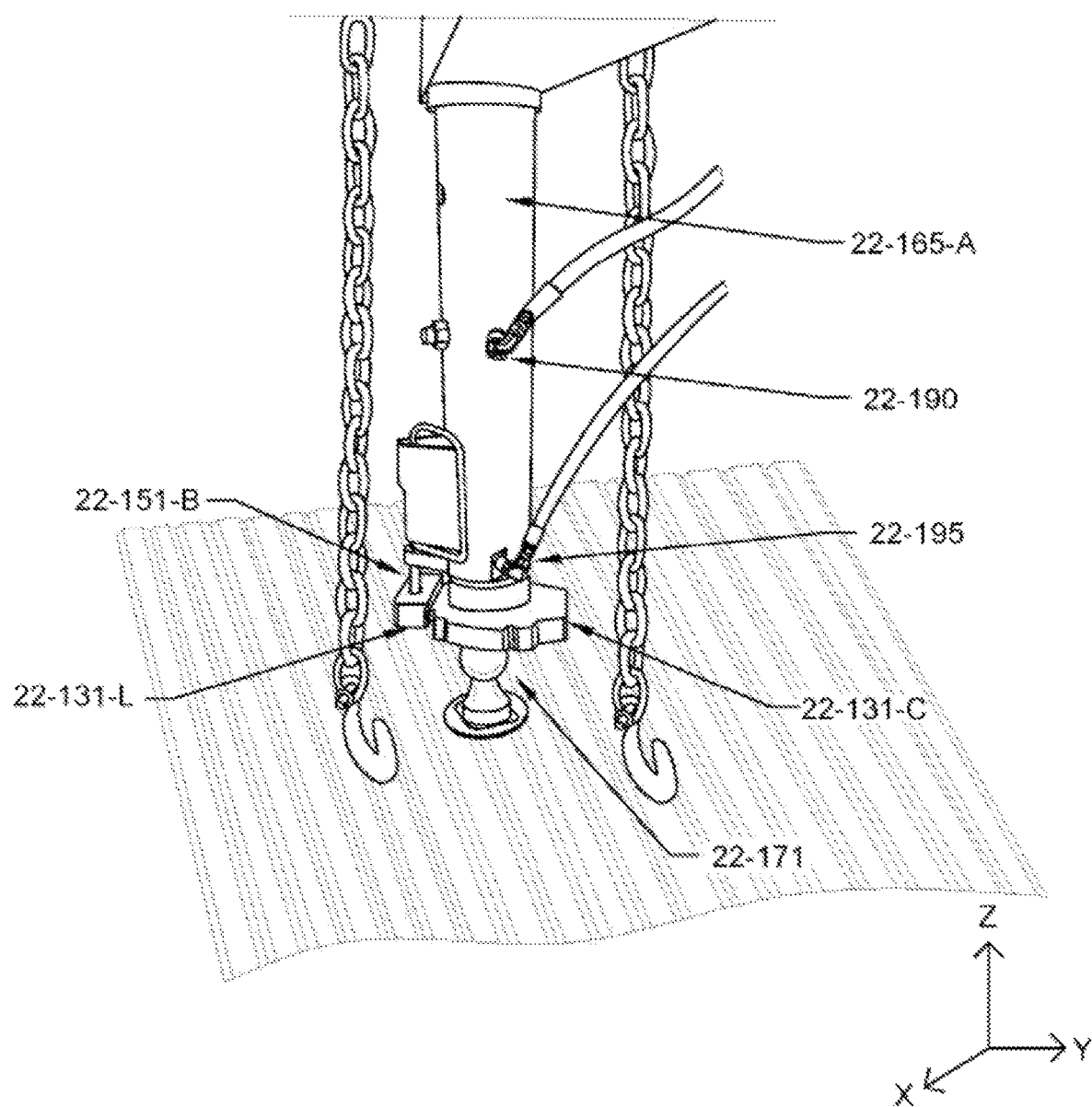

Turning to FIG. 22I, the uncoupling phase is complete. The locking dock 22-131-L has risen to meet the pin 22-151-B, which is now inserted therein. The rod is not visible and is fully retracted. The coupler 22-131-C clears the ball hitch 22-171 in the +Z direction. Upper and lower ports 22-190 and 195 are shown. The top edge of the bushing nears the pipe. In accordance with an exemplary embodiment, the bushing may touch the pipe when the rod is fully retracted. And the pipe is shown 22-165-A in FIG. 22I. The truck can now drive out from under the trailer. T The cylinder cap, 4-500 FIG. 4C, is anchored in all three directions in a pipe, 21-165-A FIG. 21B. Anchored to the cap and extending down a channel in the piston rod, 6-901 FIG. 6B, is a guide rod, 257-G-R FIG. 2. The guide rod keeps the piston rod from rotating during extension and retraction. In turn, the locking pin 21-151-B lines up with the locking dock 21-131-L of the coupler 21-131-C. Further, the connection from the trailer to the ball hitch is secure and stable when the coupler is locked upon the ball hitch. And rotation or torsion of components in the hydraulic coupler is controlled about the vertical Z axis, FIG. 21B. Embodiments of the present invention provide a ready connection of the invention to a conventional trailer frame-neck, modifying a conventional pipe. Automated mechanical locking of the ball coupler is afforded by the system and method of exemplary embodiments of the present invention. Using a hydraulic piston, exemplary embodiments of the present invention enable raising and lowering of the ball coupler without hand-cranking conventional trailer. In using a hydraulic cylinder, the present invention uses both an extension stroke and then a retraction stroke to couple the trailer to the ball hitch. And in the uncoupling process, in accordance with the present invention, an extension stroke is followed by a retraction stroke of the hydraulic piston.

The guide rod 257-G-R, FIG. 2, ensures that the piston rod 6-900, FIG. 6B, does not rotate during extension and retraction. In a conventional piston, hydraulic or pneumatic, a free end of the rod will rotate. In accordance with exemplary embodiments of the present invention, the free or coupler end 21-131-C, FIG. 21C, does not rotate about the Z axis, FIGS. 21B-21M, thus enabling automatic locking and unlocking of the coupler and foregoing or minimizing undesired torsional forces. In accordance with an exemplary embodiment of the present invention, the guide rod 257-G-R, FIG. 2, is anchored to the cylinder cap 4-500, FIG. 4C, and extends well into the rod 900 off of the rod's axial center, FIG. 1B. The cylinder cap is anchored 550 with respect to all three dimension to the gooseneck pipe 21-165-A Embodiments of the present invention afford a manual override capacity of the invention coupling system, where an existing conventional gear box with hand crank can be used in lieu of raising and lowering the trailer using a hydraulic cylinder.

The present invention may include the ready installation of the hydraulic pump and auxiliary battery in an enclosed container.

Embodiments of the present invention provide user friendly operation in industrial applications. In accordance with an exemplary embodiment, two push and hold buttons provide the respective rod extending and rod retracting movements with concurrent ball coupler displacement or load transfer as further described herein, for example with reference to FIGS. 21 and 22.

Exemplary embodiments of the present invention use a custom hydraulic piston with custom cylinder top cap. Further, exemplary embodiments of the present invention use a custom piston rod assembly.

Exemplary embodiments provide hydraulic powered ball coupler vertical displacement of near eight inches.

In accordance with yet another embodiment of the present invention, a given invention size readily connects to either a square cross section coupling frame or a circular cross section coupling frame of a same inner width and inner diameter size, respectively. Conventional load capacity is maintained in invention-piston mode relative to the conventional gooseneck trailer.

Exemplary embodiments of the present invention can provide 12,000 ft·lbs of lift via the hydraulic cylinder. Further, exemplary embodiments yield a same minimum and maximum vertical coupling distance capacity as compared to conventional manual coupling, and in turn, accommodate the same conventional trailer-truck combinations as respective conventional gooseneck trailers.

Exemplary embodiments of the present invention comprise custom, off the shelf and modified parts. Exemplary embodiments incorporate a custom dual directional piston rod head. An exemplary rod head is shown, for example, in FIG. 3B. Further the exemplary rod head is used in combination with three rings, opposite directional seals each on one side of a center ring, where rings are shown, for example, in FIG. 11.

Exemplary embodiments of the present invention have a custom bushing, 700 FIG. 7, and affixing method to anchor the ball coupler 21-131-C FIG. 21C to the free end of the piston rod, 900 FIGS. 9 and 1B.

Embodiments of the present invention yield a capacity of up to 12,000 pounds of lift (ft·lbs) with 3000 psi of extension pressure.

Another aspect of the present invention is the capacity to lower a load of 12,000 pounds (ft·lbs) with 3000 psi of retraction pressure While specific alternatives to aspects of the invention have been described herein, additional alternatives not specifically disclosed but known in the art are intended to fall within the scope of the invention. Thus, it is understood that other applications of the present invention will be apparent to those skilled in the art upon reading the described embodiments and after consideration of the appended provisional claims and drawings.

What is claimed is:

1. A hydraulic gooseneck trailer coupler, the coupler comprising:
   a gooseneck trailer neck;
   a gooseneck trailer pipe affixed to the neck;
   a piston cylinder secured within the pipe;
   a dual direction piston head housed in a cylinder cavity;
   a piston rod connected to the head;
   a ball coupler connected to the rod;
   a hydraulic pump connected via pump lines to a top and a bottom of the cylinder;
   a top cap welded to a top of the cylinder closing the top of the cylinder cavity; and
   a guide rod anchor disposed in the top cap off of a cylinder axial center.

2. The device according to claim 1, wherein:
   the guide rod anchor is internal threads.

3. The device according to claim 2, wherein:
   a guide rod with external threads at a first end mated with the internal threads of the guide rod anchor in the top cap.

4. The device according to claim 1, further comprising:
   a guide rod anchored into the guide rod anchor extending downwards into the cylinder cavity.

5. The device according to claim 4, further comprising:
   a guide rod through hole disposed off center in the piston head.

6. The device according to claim 5, further comprising:
   a guide rod extended cavity disposed off center in the piston rod.

7. The device according to claim 6, further comprising:
   a guide rod passing through the hole in the piston head and into the guide rod extended cavity disposed off center in the piston rod.

8. The device according to claim 5, further comprising:
   a cylinder nut secured to a bottom of the cylinder.

9. The device according to claim 8, further comprising:
   external threads on an outer circumference of the cylinder retaining nut;

a wiping ring mounted in a center opening of the cylinder retaining nut.

10. The device according to claim 9, further comprising:
the top cap comprising:
- a hydraulic fluid input port;
- a pipe mounting through hole; and
- a guide rod anchor disposed in the top cap off of a cylinder axial center;

a dual direction piston head disposed in the cylinder a piston rod affixed to the piston head and extending through the wiping ring.

11. The device according to claim 8, further comprising:
a bushing securing a rod end to a Coupler.

12. The device according to claim 11, further comprising:
a locking pin mounted on and near a vertical bottom of a trailer pipe;

the top cap mounted via a through hole in the trailer pipe;

a bolt through an outer side of the trailer pipe, through the top cap through hole, exiting out an opposite outer pipe side;

a washer and a nut mating with bolt threads and securing the top cap within the trailer pipe.

13. A method of hydraulic gooseneck trailer coupling, the method comprising:
using the hydraulic cylinder of claim 1.

14. The method according to claim 13, further comprising:
anchoring a guide rod to a hydraulic cylinder top cap off of axial center;

passing the guide rod through the piston head off of axial center; and inserting the guide rod into guide cavity in rod.

* * * * *